(12) United States Patent
Guarrieri et al.

(10) Patent No.: US 9,519,795 B2
(45) Date of Patent: Dec. 13, 2016

(54) INTERCONNECT PARTITION BINDING API, ALLOCATION AND MANAGEMENT OF APPLICATION-SPECIFIC PARTITIONS

(71) Applicants: Stephen Guarrieri, Malvern, PA (US); James Hunter, Malvern, PA (US); John Landis, Malvern, PA (US); Richard Kelble, Malvern, PA (US)

(72) Inventors: Stephen Guarrieri, Malvern, PA (US); James Hunter, Malvern, PA (US); John Landis, Malvern, PA (US); Richard Kelble, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 223 days.

(21) Appl. No.: 14/133,803

(22) Filed: Dec. 19, 2013

(65) Prior Publication Data
US 2014/0358972 A1 Dec. 4, 2014

Related U.S. Application Data

(60) Provisional application No. 61/827,775, filed on May 28, 2013.

(51) Int. Cl.
*G06F 17/30* (2006.01)
*G06F 21/62* (2013.01)

(52) U.S. Cl.
CPC ..... *G06F 21/6218* (2013.01); *G06F 17/30289* (2013.01); *G06F 17/30566* (2013.01); *G06F 17/30584* (2013.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 2007/0067366 A1* | 3/2007 | Landis | .......... | G06F 12/109 707/1 |
| 2009/0307713 A1* | 12/2009 | Anderson | .......... | G06F 11/0712 719/313 |
| 2011/0271277 A1* | 11/2011 | Hussain | .......... | G06F 9/5077 718/1 |

* cited by examiner

*Primary Examiner* — Son T Hoang
(74) *Attorney, Agent, or Firm* — Robert P. Marley; Richard J. Gregson

(57) ABSTRACT

One system includes one or more host computing systems, each host computing system including at least one execution core and a system memory. The system includes a plurality of virtual partitions executing on the one or more host computing systems and including a first partition having at least a portion of the system memory associated with at least one of the one or more host computing systems and configure to store a database therein. The system also includes an interconnect layer communicatively connecting the plurality of virtual partitions, the interconnect layer providing a programming interface by which direct memory access operations between partitions are coordinated. In response to database commands received at the first partition, the data stored in the database is provided to a requesting partition a direct memory access operation.

13 Claims, 26 Drawing Sheets

INTERCONNECT PARTITION BINDING API, ALLOCATION AND MANAGEMENT OF APPLICATION-SPECIFIC PARTITIONS

This application claims priority to U.S. Provisional Patent Application Ser. No. 61/827,775, filed May 28, 2013, which is incorporated by reference in its entirety.

TECHNICAL FIELD

The present application relates generally to computing systems, and in particular to applications of an interconnect system across partitioned computing resources. More particularly, the present application relates to an interconnect partition binding Application Programming Interface (API) and partition-based applications thereof.

BACKGROUND

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Virtual machine monitors (VMMs) have been used since the early 1970s to provide a software application that virtualizes the underlying hardware so that applications running on the VMMs are exposed to the same hardware functionality provided by the underlying machine without actually "touching" the underling hardware. As IA-32, or x86, architectures became more prevalent, it became desirable to develop VMMs that would operate on such platforms. Unfortunately, the IA-32 architecture was not designed for full virtualization as certain supervisor instructions had to be handled by the VMM for virtualization, but could not be handled appropriately because use of these supervisor instructions could not be handled using existing interrupt handling techniques.

Existing virtualization systems, such as those provided by VMWare and Microsoft, have developed relatively sophisticated virtualization systems that address these problems with IA-32 architecture by dynamically rewriting portions of the hosted machine's code to insert traps wherever VMM intervention might be required and to use binary translation to resolve the interrupts. This translation is applied to the entire guest operating system kernel since all non-trapping privileged instructions have to be caught and resolved. Furthermore, VMWare and Microsoft solutions generally are architected as a monolithic virtualization software system that hosts each virtualized system.

The complete virtualization approach taken by VMWare and Microsoft has significant processing costs and drawbacks based on assumptions made by those systems. For example, in such systems, it is generally assumed that each processing unit of native hardware can host many different virtual systems, thereby allowing disassociation of processing units and virtual processing units exposed to non-native software hosted by the virtualization system. If two or more virtualization systems are assigned to the same processing unit, these systems will essentially operate in a time-sharing arrangement, with the virtualization software detecting and managing context switching between those virtual systems.

This problem is compounded when considering other computing resources available to a virtualization system. For example, although virtual systems generally share processing units and communication interfaces, multiple virtual systems are typically entirely separated in terms of memory resources allocated thereto, with little (if any) sharing of resources available. When data is transferred among those systems, it typically must be transferred via a virtualized network or some other operation that introduces latency into the system due to the various layers of abstraction through which the data must be processed (e.g., through a Mellanox-based Infiniband communication protocol). This is the case even where two virtual systems are co-located on the same hardware or at least hardware in close proximity and connected by some type of high-speed interconnect, since the greatest level of distance possible in such a system are typically assumed.

Additionally, existing VMMs have relatively structured requirements for the definition of a partition. Accordingly, the VMM and partition for each particular partition are required to be co-located, and further requiring some dedicated memory, a dedicated or shared processing unit, and optionally I/O devices, which may also be shared among partitions. This limits the functionality and usability of those partitions, since the useability of the partition is limited by the resources that can be provided on a particular hardware platform. This limitation is particularly apparent in the case of database systems; although such systems perform at operations of magnitude better when data resides in memory, typical databases are sized much larger than allocated memory systems, such that on-disk storage is required on a particular host hardware system.

For these and other reasons, improvements are desirable.

SUMMARY

In accordance with the following disclosure, the above and other issues are addressed by the following:

In a first aspect, a system includes one or more host computing systems, each host computing system including at least one execution core and a system memory. The system includes a plurality of virtual partitions executing on the one or more host computing systems and including a first partition having at least a portion of the system memory associated with at least one of the one or more host computing systems and configured to store a database therein. The system also includes an interconnect layer communicatively connecting the plurality of virtual partitions, the interconnect layer providing a programming interface by which direct memory access operations between partitions are coordinated. In response to database commands received at the first partition, the data stored in the database is provided to a requesting partition via a direct memory access operation.

In a second aspect, a method of operation of a database in system memory within a virtual partition is disclosed. The method includes instantiating a plurality of virtual partitions in one or more host computing systems. The plurality of virtual partitions include a client partition and a database partition including system memory of one or more host computing systems, and the database partition includes an in-memory database maintained in the system memory. The method further includes receiving, at the database partition, a data request from a client partition hosting a database application. The method also includes, in response to the data request, copying data from the in-memory database into a portion of memory associated with a client partition.

In a third aspect, a computer-readable storage medium comprising computer-executable instructions is disclosed which, when executed on a computing system, performs a method that includes instantiating a plurality of virtual partitions in one or more host computing systems. The plurality of virtual partitions includes a client partition and a database partition, and the database partition includes system memory of one or more host computing systems. The database partition also includes an in-memory database maintained in the system memory. The method includes receiving, at the database partition, a data request from a client partition hosting a database application. The database partition includes a database manager, a data storage area, and a runtime library of programming interfaces useable to address a file organization within the database partition. The method includes, in response to the data request, copying data from the in-memory database into a portion of memory associated with a client partition, wherein copying data from the in-memory database comprises a direct memory transfer of data, thereby transferring data from the database partition to the client partition.

DETAILED DESCRIPTION

Figure 1:
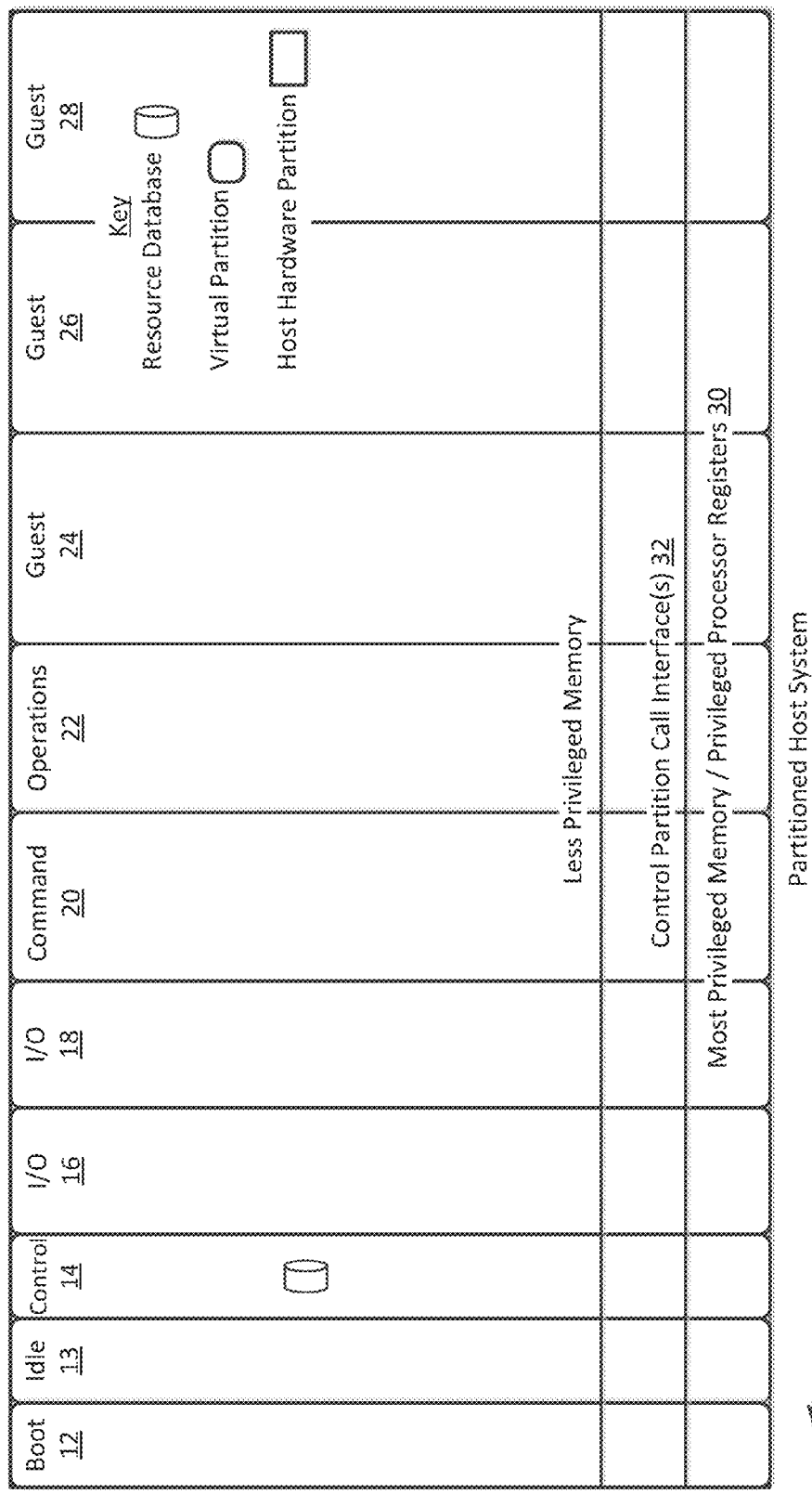
FIG. 1 illustrates system infrastructure partitions in an exemplary embodiment of a host system partitioned using the para-virtualization system of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for providing a securely partitioned virtualization system. In some examples a virtualization system has separate portions, referred to herein as monitors, used to manage access to various physical resources on which virtualized software is run. In some such examples, a correspondence between the physical resources available and the resources exposed to the virtualized software allows for control of particular features, for example by way of dedicated partitions associated with various services provided to the overall system to be hosted via the virtualization system.

Those skilled in the art will appreciate that the virtualization design of the present disclosure provides a robust, failure-tolerant, and flexible system due to the distributed functionality that can be provided across partitions, as well as the various configurations of hardware that can be used to implement the various systems disclosed. Furthermore, based at least in part on the interconnect systems implemented in the para-virtualization system disclosed herein, a low-latency interconnect, and application programming interface, allows for low latency communication among partitions. In example embodiments, partitions co-located on a host can transfer data using direct memory access techniques without requiring additional layers of communication resources, such as may be required in a clustered storage arrangement as may be required in host bus adapters provided by Mellanox Technologies of Sunnyvale, Calif.

In the context of the present disclosure, virtualization software generally corresponds to software that executes natively on a computing system, through which non-native software can be executed by hosting that software with the virtualization software exposing those native resources in a way that is recognizable to the non-native software. By way of reference, non-native software, otherwise referred to herein as "virtualized software" or a "virtualized system", refers to software not natively executed on a particular hardware system, for example due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited; rather, non-native software simply can correspond to software not hosted or executed directly on hardware resources in the absence of a monitor system used to manage such execution, and to provide an abstraction layer between the application or workload to be executed and the underlying hardware resources.

In the context of the present disclosure, various special-purpose partitions can be established based on the computing requirements of a particular system, including, for example, raw data or database partitions that can be provided as service partitions that can grant access to data by one or more guest partitions or other service partitions. In alternative arrangements, other special-purpose service partitions, such as particular types of data service, network service, or processing service partitions can be established. These partitions can be, for example, allocated resources of a host computing system that are customized for the particular resource need of that partition, and according to the anticipated workload to be executed using that partition. Furthermore, the allocated resources can be located across one or more host computing systems. In example embodiments, a data partition can be allocated a large portion of system memory of one or more host computing systems and optionally a database service (e.g., a database management system), thereby allowing for a large-scale database to be maintained entirely in system memory. In alternative embodiments, a single service partition can be focused on particular processing tasks, and can accordingly be assigned a large number of processing cores across one or more host computing systems.

I. Para-Virtualization System Architecture

Referring to FIG. 1, an example arrangement of a para-virtualization system is shown that can be used to accomplish the features mentioned above. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as a control application in a special control partition. This control application implements a server for a command channel to accept transactional requests for assignment of resources to partitions. The control application maintains the master in-memory database of the hardware resource allocations. The control application also provides a read only view of individual partitions to the associated partition monitors.

In FIG. 1, partitioned host (hardware) system (or node), shown as host computing system 10, has lesser privileged memory that is divided into distinct partitions including special infrastructure partitions such as boot partition 12, idle partition 13, control partition 14, first and second I/O partitions 16 and 18, command partition 20, and operations partition 22, as well as virtual guest partitions 24, 26, and 28. As illustrated, the partitions 12-28 do not directly access the underlying privileged memory and processor registers 30 but instead accesses the privileged memory and processor registers 30 via a hypervisor system call interface 32 that provides context switches amongst the partitions 12-28 in a conventional fashion. Unlike conventional VMMs and hypervisors, however, the resource management functions of the partitioned host computing system 10 of FIG. 1 are implemented in the special infrastructure partitions 12-22. Furthermore, rather than requiring re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-22 control resource management and physical I/O device drivers that are, in turn, used by operating systems operating as guests in the guest partitions 24-28. Of course, many other guest partitions may be implemented in a particular host computing system 10 partitioned in accordance with the techniques of the present disclosure.

A boot partition 12 contains the host boot firmware and functions to initially load the control, I/O and command partitions (elements 14-20). Once launched, the resource management "control" partition 14 includes minimal firmware that tracks resource usage using a tracking application referred to herein as a control or resource management application. Host resource management decisions are performed in command partition 20 and distributed decisions amongst partitions in one or more host computing systems 10 are managed by operations partition 22. I/O to disk drives and the like is controlled by one or both of I/O partitions 16 and 18 so as to provide both failover and load balancing capabilities. Operating systems in the guest partitions 24, 26, and 28 communicate with the I/O partitions 16 and 18 via memory channels (FIG. 3) established by the control partition 14. The partitions communicate only via the memory channels. Hardware I/O resources are allocated only to the I/O partitions 16, 18. In the configuration of FIG. 1, the hypervisor system call interface 32 is essentially reduced to context switching and containment elements (monitors) for the respective partitions.

Figure 2:
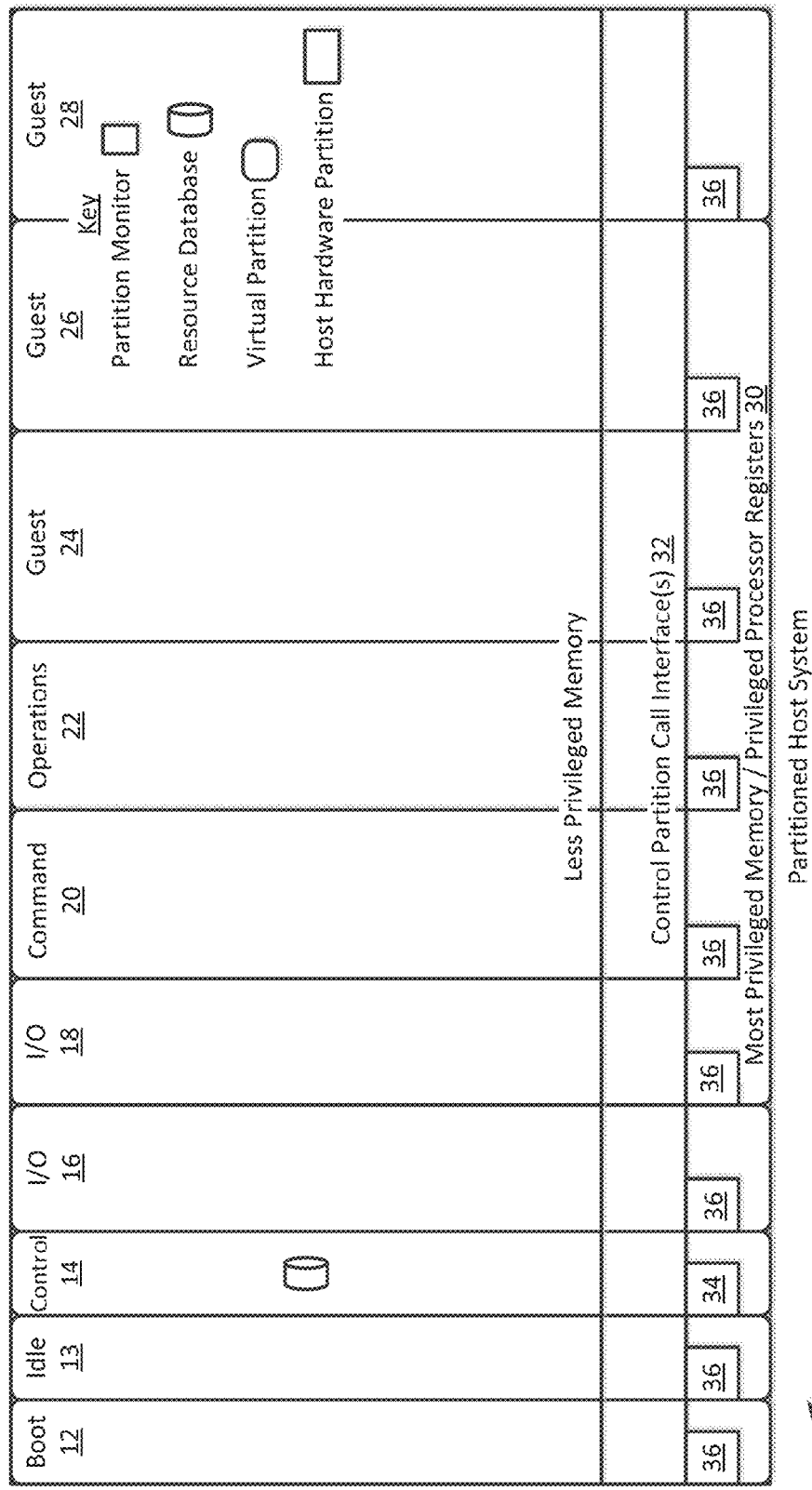
FIG. 2 illustrates the partitioned host of FIG. 1 and the associated partition monitors of each partition.
Figure 3:
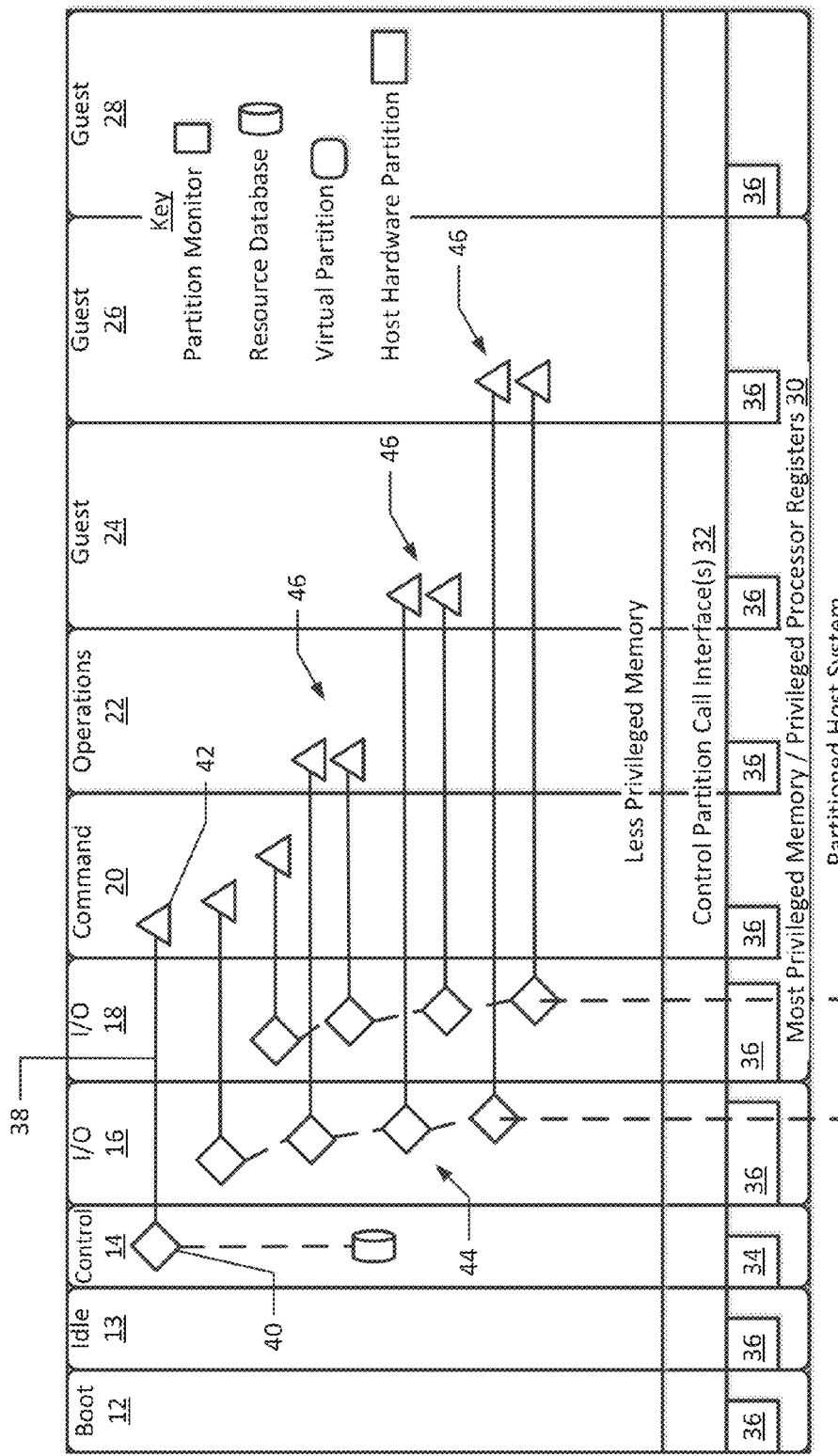
FIG. 3 illustrates memory mapped communication channels amongst various partitions of the para-virtualization system of FIG. 1.

The resource manager application of the control partition 14, shown as application 40 in FIG. 3, manages a resource database 33 that keeps track of assignment of resources to partitions and further serves a command channel 38 to accept transactional requests for assignment of the resources to respective partitions. As illustrated in FIG. 2, control partition 14 also includes a partition (lead) monitor 34 that is similar to a virtual machine monitor (VMM) except that it provides individual read-only views of the resource database in the control partition 14 to associated partition monitors 36 of each partition. Thus, unlike conventional VMMs, each partition has its own monitor 36 such that failure of the monitor 36 does not bring down the entire host computing system 10. As will be explained below, the guest operating systems in the respective partitions 24, 26, 28 (referred to herein as "guest partitions") are modified to access the associated partition monitors 36 that implement together with hypervisor system call interface 32 a communications mechanism through which the control, I/O, and any other special infrastructure partitions 14-22 may initiate communications with each other and with the respective guest partitions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 24-28) need not be aware of the control system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to I/O partitions 16, 18 that use memory channels to communicate with their client partitions. A responsibility of a monitor 36 is instead to protect processor provided resources (e.g., processor privileged functions and memory management units). The monitor 36 also protects access to I/O hardware primarily through protection of memory mapped I/O. The monitor 36 further provides channel endpoint capabilities which are the basis for I/O capabilities between guest partitions.

The monitor 34 for the control partition 14 is a "lead" monitor with two special roles. It creates and destroys monitors 36, and also provides services to the created monitors 36 to aid processor context switches. During a processor context switch, monitors 34, 36 save the guest partition state in the virtual processor structure, save the privileged state in virtual processor structure and then invoke the control monitor switch service. This service loads the privileged state of the target partition monitor and switches to the target partition monitor which then restores the remainder of the guest partition state.

The most privileged processor level (e.g., x86 ring 0) is retained by having the monitors 34, 36 running below the system call interface 32. This is most effective if the processor implements at least three distinct protection levels: e.g., x86 ring 1, 2, and 3 available to the guest OS and applications. The control partition 14 connects to the monitors 34, 36 at the base (most privileged level) of each partition. The monitor 34 grants itself read only access to the partition descriptor in the control partition 14, and the control partition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, as explained in further detail below, the monitors 34, 36 of the invention are unlike a classic VMM in that the master resource database 33 is contained in a virtual (control) partition for recoverability, the resource database 33 implements a simple transaction mechanism, and the virtualized system is constructed from a collection of cooperating monitors 34, 36 whereby a failure in one monitor 34, 36 need not result in failure of all partitions and need not result in the failure of a multiprocessor/multi-core partition; in particular, any symmetric multiprocessing system can, due to use of a monitor per execution core, preserve operation of the partition using remaining execution cores. Furthermore, failure of a single physical processing unit need not result in failure of all partitions of a system, since partitions are affiliated with different processing units.

The monitors 34, 36 of the invention are also different from classic VMMs in that each partition is contained by its assigned monitor(s), partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the control partition resource database 33.

Partitions in the control environment include the available resources organized by host computing system 10. Available computing resources in a host node, also referred to herein as a host computing system are described by way of example in FIGS. 4-5. Generally, a partition is a software construct (that may be partially hardware assisted) that allows a hardware system platform (or hardware partition) to be "partitioned," or separated, into independent operating environments. The degree of hardware assist (e.g., physical hardware separation) is platform dependent but by definition is less than 100% (since by definition a 100% hardware assist provides hardware partitions). The hardware assist may be provided by the processor or other platform hardware features. For example, each partition may be associated with a separate processing core or cores, but may each be associated with a separate portion of the same system memory, networking resources, or other features. Or, partitions may time-share processing resources, but be associated with separate memory, networking, and/or peripheral devices. In general from the perspective of the control partition 14, a hardware partition is generally indistinguishable from a commodity hardware platform without partitioning hardware.

Unused physical processors are assigned to a special 'Idle' partition 13. The idle partition 13 is the simplest partition that is assigned processor resources. It contains a virtual processor for each available physical processor, and each virtual processor executes an idle loop that contains appropriate processor instructions to minimize processor power usage. The idle virtual processors may cede time at the next control time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple control partitions 14 are also possible for large host partitions to avoid a single point of failure. Each would be responsible for resources of the appropriate portion of the host computing system 10. Resource service allocations would be partitioned in each portion of the host system 10. This allows clusters to run within a host computing system 10 (one cluster node in each zone) and still survive failure of a control partition 14.

As illustrated in FIGS. 1-3, each page of memory in a control partition-enabled host computing system 10 is owned by one of its partitions. Additionally, each hardware I/O device is mapped to one of the designated I/O partitions 16, 18. These I/O partitions 16, 18 (typically two for redundancy) run special software that allows the I/O partitions 16, 18 to run the I/O channel server applications for sharing the I/O hardware. Alternatively, for I/O partitions executing using a processor implementing Intel's VT-d technology, devices can be assigned directly to non-I/O partitions. Irrespective of the manner of association, such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host computing system 10 owns all resources available for allocation, and as such is tracked by resource database 33.

In the embodiments discussed herein, control partition 14 concentrates on server input/output requirements. Plug and Play operating systems function with appropriate virtual port/miniport drivers installed as boot time drivers. The hypervisor system call interface 32 may, in some embodiments, include an Extensible Firmware Interface (EFI) to provide a modern maintainable firmware environment that is used as the basis for the virtual firmware. The firmware provides standard mechanisms to access virtual Advanced Configuration and Power Interface (ACPI) tables. These tables allow operating systems to use standard mechanisms to discover and interact with the virtual hardware.

The boot partition 12 may provide certain Basic Input/Output System (BIOS) compatibility drivers if and when necessary to enable boot of operating systems that lack EFI loaders. The boot partition 12 also may provide limited support for these operating systems.

Different partitions may use different firmware implementations or different firmware versions. The firmware identified by partition policy is loaded when the partition is activated. During an upgrade of the monitor associated with the control partition, running partitions continue to use the loaded firmware, and may switch to a new version as determined by the effective partition policy the next time the partition is reactivated.

As noted above, monitors 36 provide enforcement of isolation from other partitions. The monitors 36 run at the most privileged processor level, and each partition has one or more monitors mapped into privileged address space. Each monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 24, 26, 28, and the lead monitor 34 constrains the resource management application in the control partition 14 and uses its access and special hypervisor system call interface 32 with the resource management application to communicate individual partition resource lists with the associated partition monitors 36.

According to some embodiments, there are two main categories of partitions in the virtualization system of the present disclosure. The 'user' partitions run guest operating systems for customer applications, and the system infrastructure partitions provide various platform infrastructure services. For reliability, the virtualization system architecture minimizes any implementation that is not contained within a partition, since a failure in one partition can be contained and need not impact other partitions.

As will be explained in more detail below, system partition types can include:
Boot 12
Idle 13
Control 14
Command 20
Operations 22
I/O 16, 18

Each of these types is briefly discussed below.

Boot Partition 12

The boot partition 12 has assigned thereto one virtual CPU (corresponding to a physical processing core or a fractional/timeshared part thereof), and contains the hardware partition boot firmware. It is used during recovery operations when necessary to boot and reboot the command partition 20 and the I/O partitions 16, 18. During bootstrap, the boot partition 12 reserves available memory and constructs the control partition 14 and the initial resource map in resource database 33 with all memory assigned either to the boot partition 12, the control partition 14, or the 'available' partition. The boot partition 12 initiates transactions to the resource manager application until it has also booted the command partition 20. At this point the control partition 14 is attached to the command partition 20 and accepts only its command transactions. The boot partition boot processor also initializes all additional processors to run the idle partition 13.

Idle Partition 13

In example embodiments, the idle partition 13 has one virtual CPU for each physical CPU. These virtual CPUs are used as place holders in the system's CPU schedule. If the control partition 14 or partition monitor 34 error recovery must remove a CPU/partition from the schedule, it is replaced with a reference to one of these virtual CPUs. Idle processors 'run' in the idle partition 13, rather than the control partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Control Partition 14

The control partition 14 owns the memory that contains the resource database 33 that stores the resource allocation maps. This includes the 'fractal' map for memory, the processor schedule, and mapped I/O hardware devices. For Peripheral Component Interconnect (PCI) I/O hardware, this map would allocate individual PCI devices, rather than require I/O partitions 16, 18 to enumerate a PCI bus. Different devices on the same PCI bus can be assigned to different I/O partitions 16, 18. A resource allocation application in the control partition 14 tracks the resources, applies transactions to the resource database 33, and is also the server for the command and control channels. The resource allocation application runs in the control partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the application. It constrains itself to memory writes of memory associated with individual partitions and read only of the master resource maps in the resource database 33.

It is noted that, when multiple control partitions 14 are used, an associated command partition 20 is provided for each. This allows the resource database 33 of a large host to be (literally) partitioned and limits the size of the largest virtual partition in the host while reducing the impact of failure of an control partition 14. Multiple control partitions 14 are recommended for (very) large host partitions, or anytime a partitioned virtualized system can contain the largest virtual partition.

Command Partition 20

In example embodiments, the command partition 20 owns the resource allocation policy for each hardware partition 10. The operating environment is, for example, XP embedded which provides a .NET Framework execution environment. Another possibility is, for example, Windows CE and the .NET Compact Framework.

The command partition 20 maintains a synchronized snapshot of the resource allocation map managed by the resource management application, and all changes to the map are transactions coordinated through the command channel 38 (FIG. 3) with the control partition 14. The resource management application implements the command channel 38 to accept transactions only from the command partition 20.

It is noted that in a multiple host hardware partition environment, a stub command partition 20 in each host 10 could simply run in the EFI environment and use an EFI application to pipe a command channel 38 from the control partition 14, through a network, to a shared remote command partition 20. However, this would have an impact on both reliability and recovery times, while providing only a modest cost advantage. Multiple command partitions 20 configured for failover are also possible, especially when multiple control partitions 14 are present. Restart of a command partition 20 occurs while other partitions remain operating with current resource assignments.

In accordance with the present disclosure, only a resource service in the command partition 20 makes requests of the resource manager application in the control partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the control resource manager application and provides services to a higher level policy service that runs in the operations partition 22 (described below) and is tightly coupled with (i.e. implements) a persistent partition configuration database, and is a client of the resource service. The resource service also provides monitoring services for the presentation tier. The partition resource objects are tightly controlled (e.g. administrators can not install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

In some embodiments, the operations partition 22 owns the configuration policy for the domains in one or more host computing systems 10. The operations partition 22 is also where a data center operations (policy) service runs. As will be explained below, at least one host computing system 10 in a given virtual data center will have an operations partition 22. Not all host computing systems 10 run an operations partition 22. An operations partition 22 may be provided by multiple hosts in a virtual data center for load balancing and failover. The operations partition 22 does not need to run within a given hardware partition, and need not run as a virtual partition. The operating environment within the operations partition 22 can be, for example, MICROSOFT WINDOWS XP Professional or Windows Server, or analogous operating environments. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be a purpose of customization. The partition policy objects are clients of the resource objects. The policy service provides configuration services for the presentation tier.

The operations partition user interface components are typically integrated within the operations partition 22. An exemplary implementation may use Hypertext Markup Language (HTML) Version 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

A resource service in the command partition 20 selects appropriate resources and creates a transaction to assign the resources to new partitions. The transaction is sent to the control partition 14 which saves transaction request to un-cached memory as a transaction audit log entry (with before and after images). The transaction is validated and applied to the resource database 33.

An audit log tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the resource allocation software to rollback any partially completed transaction that survived the cache. It should be noted that a transaction that has not completed would have assigned some but not all resources specified in a transaction to a partition and the rollback would undo that assignment if it survived the cache.

I/O Partitions 16, 18

In the embodiment shown, a plurality of I/O partitions 16, 18 are active on a host node 10. I/O partitions 16, 18 allow multi-path I/O from the user partitions 24-28 and allow certain types of failures in an I/O partition 16, 18 to be recovered transparently. All I/O hardware in host hardware partitions is mapped to the I/O partitions 16, 18. These partitions are typically allocated a dedicated processor to minimize latency and allow interrupt affinity with limited overhead to pend interrupts that could occur when the I/O partition 16, 18 is not the current context. The configuration for the I/O partitions 16, 18 determines whether the storage, network, and console components share virtual partitions or run in separate virtual partitions.

User Partitions 24-28

The user partitions 24, 26, 28 host the workloads that form the purpose of the virtualization system, and are described in normal domains for a user. These are the partitions that a user primarily interacts with. All of the other partition types are described in the system domains and are generally kept out of view of typical users.

System Startup

When the host computing system 10 is booted, the EFI firmware is loaded first. The EFI firmware boots the operating system associated with the control partition 14. The EFI firmware uses a standard mechanism to pick the boot target. Assuming the loader is configured and selected, boot proceeds as follows.

The loader allocates almost all of available memory to prevent its use by the firmware. (It leaves a small pool to allow proper operation of the firmware.) The loader then creates the resource database's memory data structures in the allocated memory (which includes a boot command channel predefined in these initial data structures). The loader then uses the EFI executable image loader to load the control monitor 34 and monitoring application into the control partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the control partition 14. At this point the boot loader sends a final command to the control partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the control partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the control partition 14 and re-obtain the boot storage hardware. This is used to reboot the first I/O partition 16.

The boot partition 12 remains running to reboot the I/O and command partitions 16, 20 should they fail during operation. The control partition 14 implements watchdog timers to detect failures in these (as well as any other) partitions. The policy service then activates other infrastructure partitions as dictated by the current policy. This would typically start the redundant I/O partition 18.

If the present host computing system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

Referring to FIG. 3, virtual channels are the mechanism partitions use in accordance with the invention to connect to zones and to provide fast, safe, recoverable communications amongst the partitions. For example, virtual channels provide a mechanism for general I/O and special purpose client/server data communication between guest partitions 24, 26, 28 and the I/O partitions 16, 18 in the same host. Each virtual channel provides a command and I/O queue (e.g., a page of shared memory) between two partitions. The memory for a channel is allocated and 'owned' by the guest partition 24, 26, 28. These queues are discussed in further detail below in connection with the interconnect Application Programming Interface (API) as illustrated in FIGS. 6-9. The control partition 14 maps the channel portion of client memory into the virtual memory space of the attached server partition. The control application tracks channels with active servers to protect memory during teardown of the owner guest partition until after the server partition is disconnected from each channel. Virtual channels can be used for command, control, and boot mechanisms as well as for traditional network and storage I/O.

As shown in FIG. 3, the control partition 14 has a channel server 40 that communicates with a channel client 42 of the command partition 20 to create the command channel 38. The I/O partitions 16, 18 also include channel servers 44 for each of the virtual devices accessible by channel clients 46. Within each guest virtual partition 24, 26, 28, a channel bus driver enumerates the virtual devices, where each virtual device is a client of a virtual channel. The dotted lines in I/O partition 16 represent the interconnects of memory channels from the command partition 20 and operations partitions 22 to the virtual Ethernet switch in the I/O partition 16 that may also provide a physical connection to the appropriate network zone. The dotted lines in I/O partition 18 represent the interconnections to a virtual storage switch. Redundant connections to the virtual Ethernet switch and virtual storage switches are not shown in FIG. 3. A dotted line in the control partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

Additional details regarding possible implementation details of a partitioned, para-virtualization system, including discussion of multiple are discussed in U.S. Pat. No. 7,984, 104, assigned to Unisys Corporation of Blue Bell, Pa., the disclosure of which is hereby incorporated by reference in its entirety.

II. Structures for Establishing Low-Latency Interconnect

Figure 4:
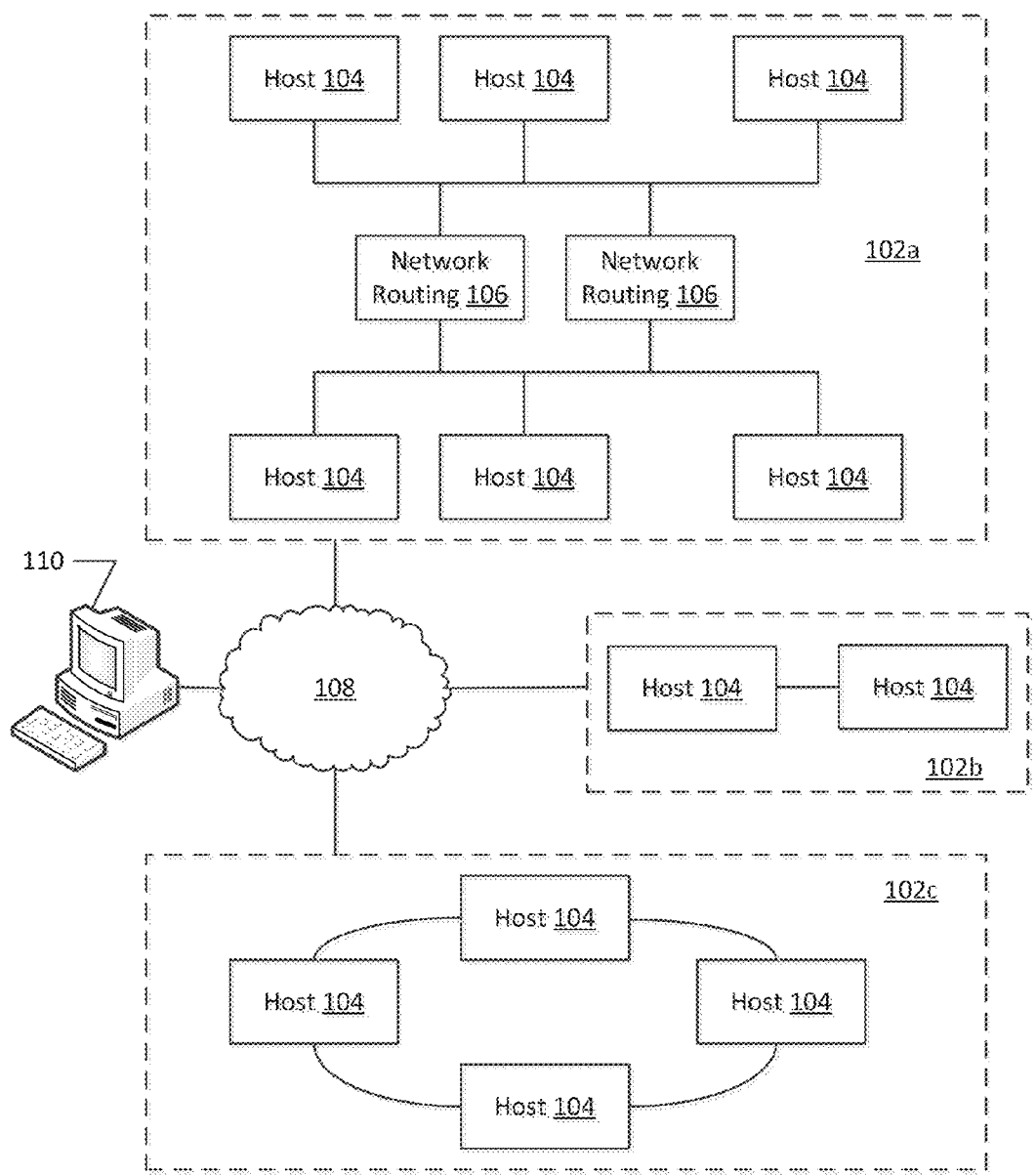
FIG. 4 illustrates a distributed multi-host system in which aspects of the present disclosure can be implemented.
Figure 5:
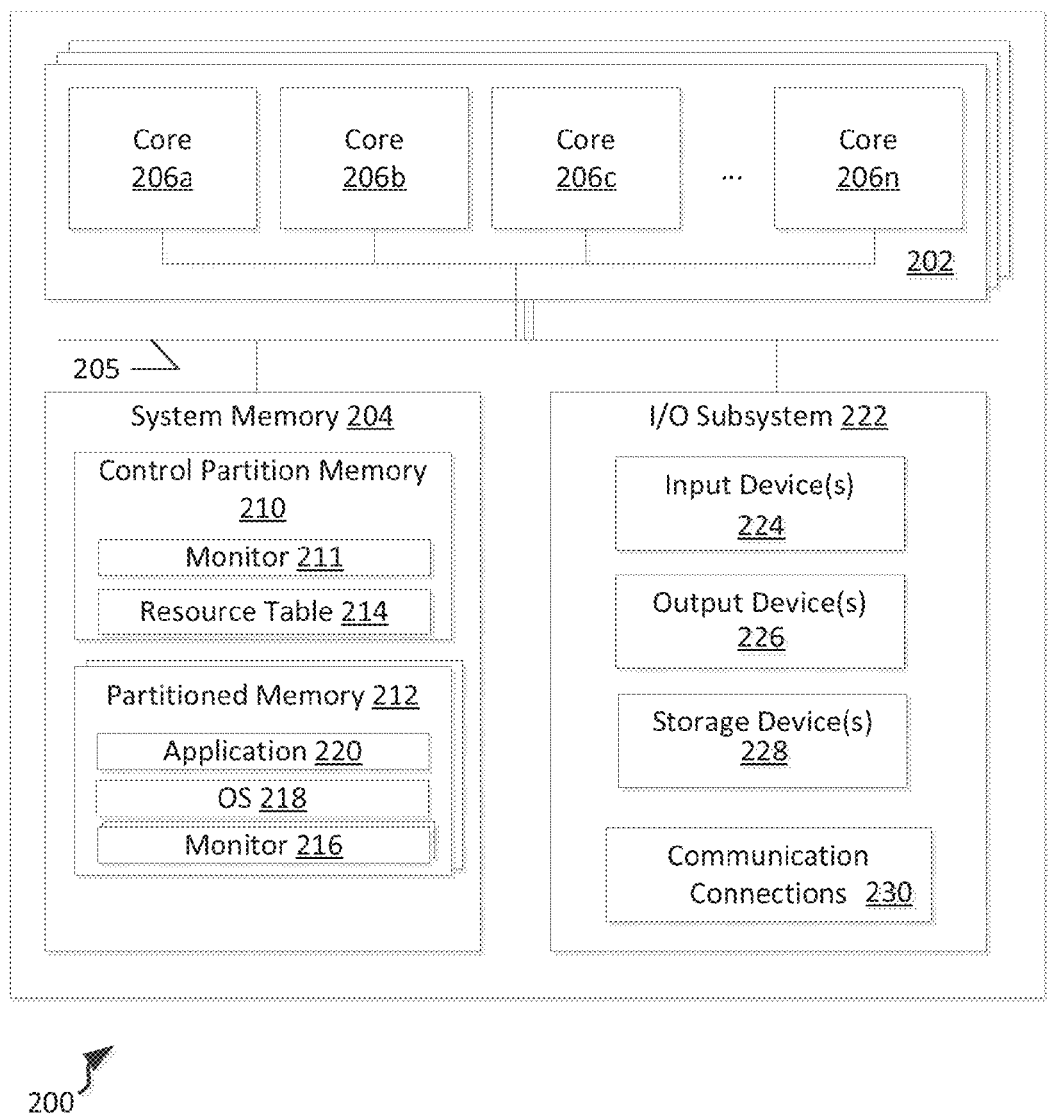
FIG. 5 illustrates an example block diagram of a host computing system useable to implement the para-virtualization systems of FIGS. 1-3, above.

Referring now to FIGS. 4-9, example arrangements of computing resources are illustrated for establishing a para-virtualization system across a plurality of host computing systems, such as host computing system s 10 of FIGS. 1-3, are shown. In particular, FIGS. 4-5 illustrate example computing resources in which the para-virtualization systems described herein can be implemented; FIGS. 6-9 illustrate example interconnection structures useable within particular partitions to establish a low-latency interconnect messaging construct allowing for inter-partition communication without requiring communication interface-speed data transfers between partitions.

As illustrated in FIG. 4, a system 100 in which the para-virtualization systems of the present disclosure can be implemented is shown. The system 100 is, in the embodiment shown, distributed across one or more locations 102, shown as locations 102a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 102a-c each include one or more host systems 104. The host systems 104 represent host computing systems, and can take any of a number of forms. For example, the host systems 104 can be server computing systems having one or more processing cores and memory subsystems and are useable for large-scale computing tasks. In one example embodiment, a host system 104 can be as illustrated in FIG. 5.

As illustrated in FIG. 4, a location 102 within the system 100 can be organized in a variety of ways. In the embodiment shown, a first location 102a includes network routing equipment 106, which routes communication traffic among the various hosts 104, for example in a switched network configuration. Second location 102b illustrates a peer-to-peer arrangement of host systems. Third location 102c illustrates a ring arrangement in which messages and/or data can be passed among the host computing systems themselves, which provide the routing of messages. Other types of networked arrangements could be used as well.

In various embodiments, at each location 102, the host systems 104 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 102a-c, a variety of communication technologies can also be used to provide communicative connections of host systems 104 at different locations. For example, a packet-switched networking arrangement, such as via the Internet 108, could be used. Preferably, the interconnections among locations 102a-c are provided on a high-bandwidth connection, such as a fiber optic communication connection.

In the embodiment shown, the various host system 104 at locations 102a-c can be accessed by a client computing system 110. The client computing system can be any of a variety of desktop or mobile computing systems, such as a desktop, laptop, tablet, smartphone, or other type of user computing system. In alternative embodiments, the client computing system 110 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 104 within the overall system 100 can be used; for example, different host systems 104 may have different numbers or types of processing cores, and different capacity and type of memory and/or caching subsystems could be implemented in different ones of the host system 104. Furthermore, one or more different types of communicative interconnect technologies might be used in the different locations 102*a-c*, or within a particular location.

Referring to FIG. 5, an example block diagram of a host computing system 200 useable to implement the paravirtualization systems of FIGS. 1-3, is shown. The host computing system 200 can, in some embodiments, represent an example of a host system 104 of FIG. 4, useable within the system 100. The host computing system 200 includes one or more processing subsystems 202, communicatively connected to a system memory 204. Each processing subsystem 202 can include one or more processing cores 206, shown as processing cores 206*a-n*. Each processing core can, in various embodiments, include one or more physical or logical processing units capable of executing computer-readable instructions. In example embodiments, the processing cores 206*a-n* can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 202 can include one or more card-based processing subsystems including a plurality of sockets for supporting execution cores 206*a-n*, or alternatively can support a socket-based or mounted arrangement in which one or more execution cores are included on a single die to be mounted within the host computing system 200. Furthermore, in the embodiment shown, a plurality of processing subsystems 202 can be included in the host computing system, thereby providing a system in which one or more cores could be allocated to different partitions hosted by the same computing hardware; in alternative embodiments, a single processing subsystem including one or more processing cores 206*a-n* could be included in the host computing system 200, and that processing subsystem 202 could be implemented without separation from system memory 204 by a card-based implementation.

As illustrated, the system memory 204 is communicatively interconnected to the one or more processing subsystems 202 by way of a system bus 205. The system bus is largely dependent upon the architecture and memory speed support of the processing subsystems with which it is implemented; although example systems provide different frequencies and throughputs of such system buses, in general the bus system between processing subsystems 202 and the system memory is a low-latency, high bandwidth connection useable to rapidly retrieve data from the system memory 204. System memory 204 includes one or more computer storage media capable of storing data and/or instructions in a manner that provides for quick retrieval of such data and/or instructions by a corresponding processing core 206. In different embodiments, the system memory 204 is implemented in different ways. For example, the memory 204 can be implemented using various types of computer storage media.

In the embodiment shown, system memory 204 can be allocated to one or more partitions using the software described herein. In the example illustration shown, subsections of the system memory 204 can be allocated to a control partition section 210 and one or more memory partitions 212. The control partition section 210 includes a monitor 211, which in some embodiments can represent monitor 34. The control partition section 210 can also include a resource database 214 that tracks resources allocated to other partitions within the host computing system 200. This can include, for example, a listing of execution cores 206, capacity and location of system memory 204, as well as I/O devices or other types of devices associated with each partition. In example embodiments, the resource database 214 can correspond to database 33 of FIGS. 1-3.

In the embodiment shown, the system memory 204 includes memory partitions 212 which each are associated with different partitions formed within a host computing system 200. The memory partitions 212 can, in the embodiment shown, each include a monitor 216, an associated operating system 218, and one or more applications or workloads 220 to be executed within the partition. Since each memory partition 212 can be associated with one or more execution cores 206 in the resource database 214, the assigned execution cores can be used to access and execute the monitor software 216 as well as the operating system 218 and workloads 220.

It is noted that in some embodiments, the partition 212 may include multiple instances of the monitor software 216. This may be the case, for example, for partitions that have allocated thereto more than one execution core. For such cases, monitor software 216 may be allocated for and used with each execution core. Therefore, there may be more than one such monitor executing per partition, with each monitor handling various I/O, memory, or interrupt servicing tasks that may be issued with respect to that particular execution core. Each monitor supervises execution of software within a partition as allocated to a particular execution n core; accordingly, if a single partition has multiple execution cores, the operating system 218 may allocate execution of operating system tasks, or the workload(s) 220, to one or both of the execution cores. The host computing device includes an I/O subsystem 222 that includes one or more input devices 224, output devices 226, and storage devices 228. The input devices 224 can include, for example, a keyboard, a mouse, a pen, a sound input device, a touch input device, etc. Output device(s) 226 can include, for example, a display, speakers, a printer, etc. The aforementioned devices are examples and others may be used. Storage devices 228 store data and software instructions not directly accessible by the processing subsystems 202. In other words, the processing subsystems 202 perform an I/O operation to retrieve data and/or software instructions from the storage device 228. In various embodiments, the secondary storage device 228 includes various types of computer storage media. For example, the secondary storage device 228 can include one or more magnetic disks, magnetic tape drives, optical discs, solid state memory devices, and/or other types of computer storage media.

The I/O subsystem 222 further includes one or more communication connections 230. The communication connections 230 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, WiMax, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

It is noted that, in some embodiments of the present disclosure, other arrangements of a partition may be included as well, providing various allocations of execution cores 206, system memory 204, and I/O devices 224, 226 within the I/O subsystem 222. For example, a partition may include zero or more execution cores 206; in the event that no processor is included with the partition, the partition may lack a monitor 216, and may instead of having an executable operating system 218 may instead include a library of commands accessible to one or more services partitions, for example useable to provide I/O or memory services to those other service partitions. Furthermore, a particular partition could be allocated access to a storage device 228 or communication connections 230.

It is noted that, in typical hypervisor arrangements, failures occurring in one execution core allocated to the partition result in failure of the partition overall, since the failure results in failure of the monitor associated with the partition. In connection with the present disclosure, partitions including multiple monitors can potentially recover from such failures by restarting the execution core and associated monitor using the remaining, correctly-executing monitor and execution core. Accordingly, the partition need not fail.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally excludes transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 4-5 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 200, it is recognized that in certain embodiments not all such components or features may be included within a computing device executing according to the methods and systems of the present disclosure. Furthermore, different types of hardware and/or software systems could be incorporated into such an electronic computing device.

Figure 6:
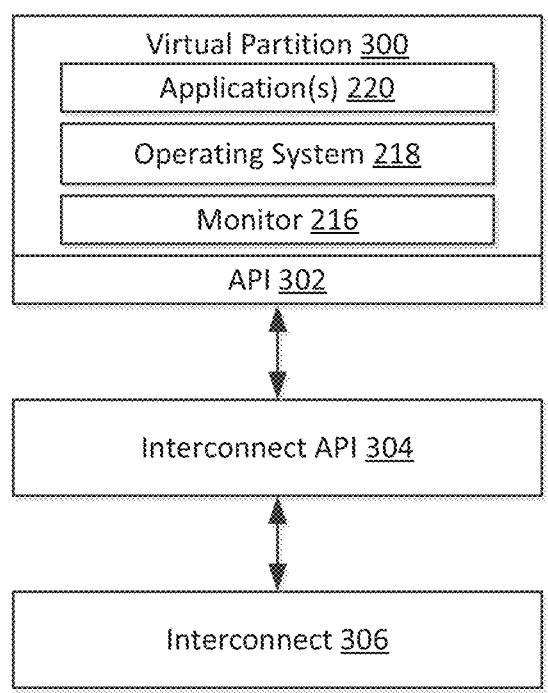
FIG. 6 illustrates a general block diagram of an interface to underlying connectivity layers for a partition allocated within the para-virtualization system of the present disclosure.

Referring now to FIG. 6, a general block diagram of a partition having an interface to underlying connectivity layers is shown, as allocated within the para-virtualization system of the present disclosure. In general, FIG. 6 illustrates a partition 300 that includes partitioned system memory, such as a portion of system memory 204 of FIG. 5. The partition 300 includes, as discussed above, a monitor 216, an associated operating system 218, and one or more applications or workloads 220 to be executed within the partition. The partition 300 further includes an application programming interface (API) instantiation 302 including a plurality of callable functions implemented, for example, via the monitor 216, and useable to interface the virtual partition 300 to an interconnect API 304. The interconnect API 304 in turn controls communication with an interconnect layer 306, which can, for example, correspond to an underlying low-latency interconnect to other partitions included within a particular multi-partition, para-virtualization system.

In some embodiments, the partition 300 can be referred to as a "virtual" partition, indicating that the partition 300 includes some level of abstraction between the hardware computing resources allocated thereto and the applications 220 and operating system 218 executing within that partition. For example, the partition may be virtual in the sense that it shares computing resources with another partition, or that it operates on a different computing architecture than is expected by the operating system 218 (and therefore is hosted by some additional emulation system), or that at least a portion of the computing resources accessed by the partition are in fact emulated. In some embodiments, partitions are at least partially virtual by adding an interconnection layer that abstracts an underlying communications transport used by the partition, such as by using interconnect instantiation 302 and API 304.

Figure 7:
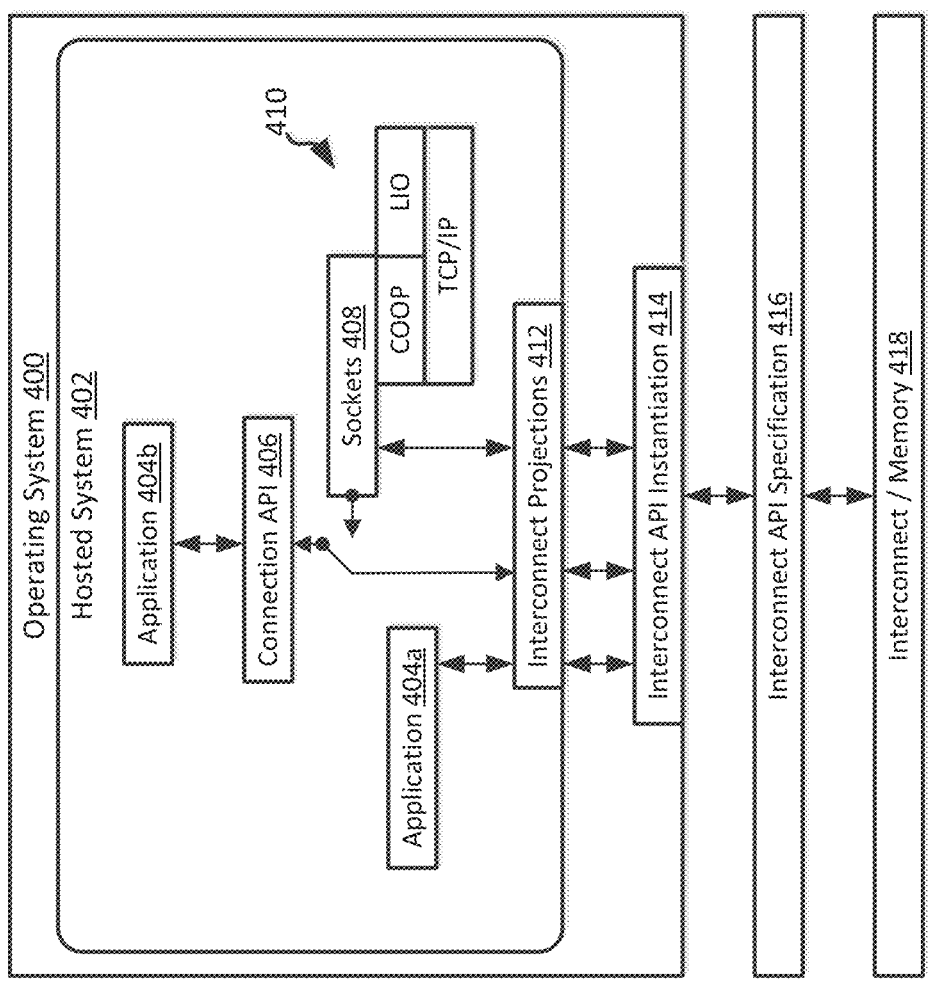
FIG. 7 illustrates a block diagram of interconnection to an application programming interface addressable from a partition allocated within the para-virtualization system of the present disclosure.
Figure 8:
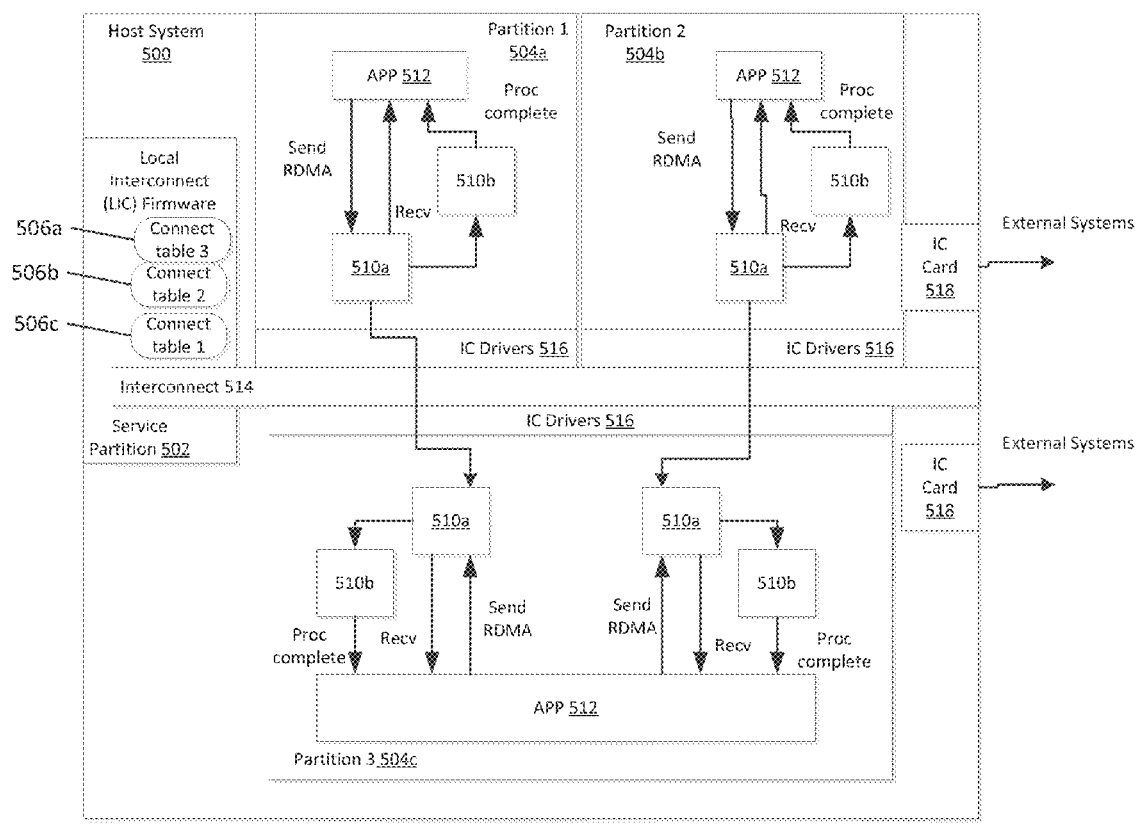
FIG. 8 illustrates a detailed block diagram illustrating functional interconnections among partitions in a host computing system, according to an example embodiment.
Figure 9:
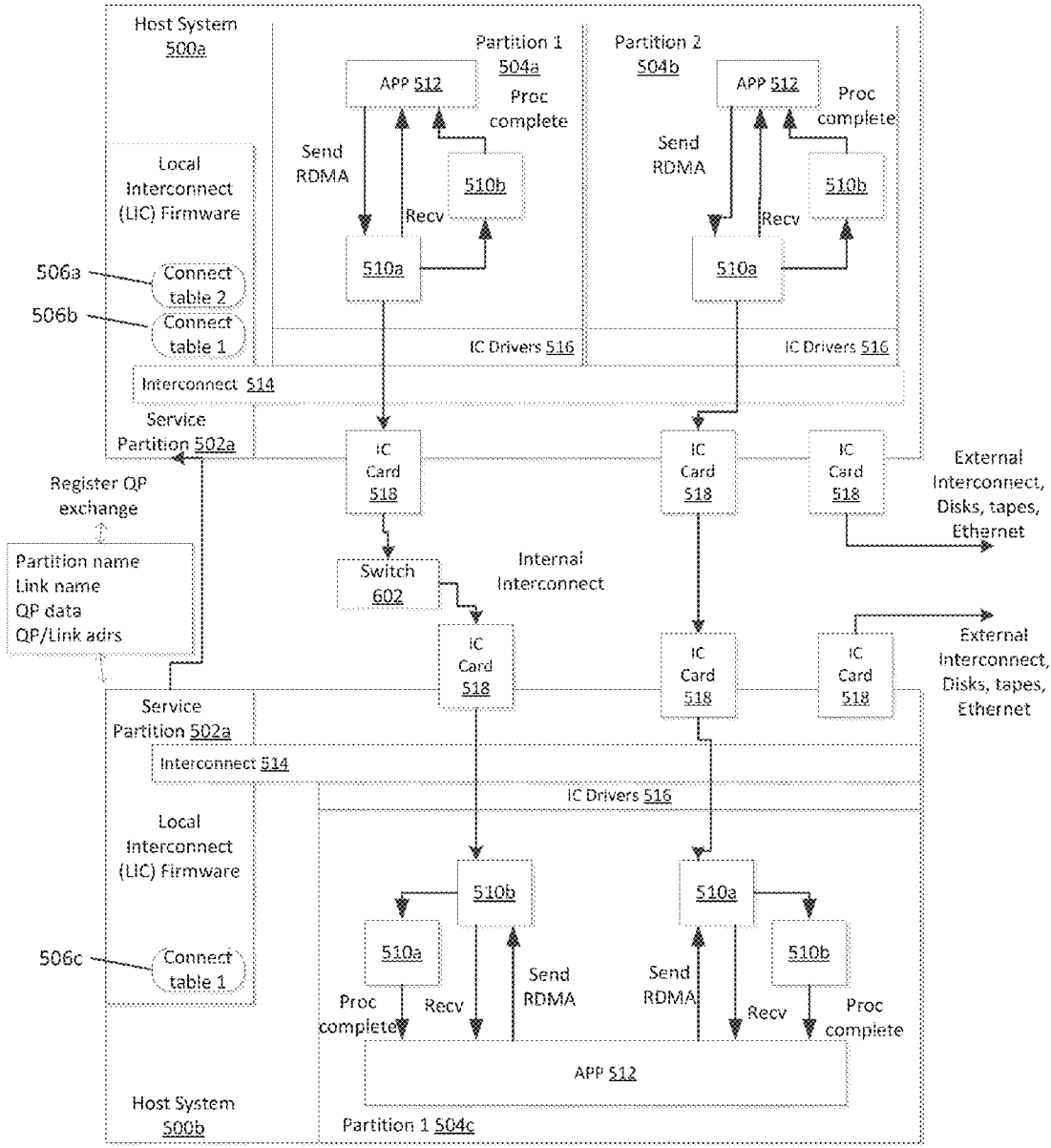
FIG. 9 illustrates a detailed block diagram illustrating functional interconnections among partitions distributed across a plurality of host computing systems, according to an example embodiment.

As further illustrated in FIGS. 7-9, the API instantiation 302 exposes a plurality of commands included in the interconnect API 304 to the partition 300, and manages communication with the API. These commands can be, in some embodiments, verbs or structures, analogous to commands published by the Open Fabrics Alliance (OFA), as part of the OpenFabrics Enterprise Distribution (OFED) communications structure for Direct Memory Access (DMA) or Remote DMA (RDMA) and kernel bypass. Details regarding such commands are discussed in further detail in Section III, below.

In example embodiments, the API instantiation 302 also provides instantiation of message and/or data queues useable to communicate data among partitions. Interconnect API provides a layer of abstraction between the underlying interconnect layer 306, which corresponds to a hardware layer included within and among host computing systems as illustrated in FIGS. 4-5.

As illustrated in FIG. 7, a block diagram illustrating a particular implementation of interconnection of a partition using an application programming interface specification and associated instantiation is illustrated in the context of a virtualized or hosted system residing on a partition. In the example implementation shown, which can form a portion of the system 10 of FIGS. 1-3, an operating system 400 hosts a hosted system 402, which can include, for example, applications 404a-b, and an associated connection API 406. The applications 404a-b correspond to a workload hosted within the hosted system 402, and which transmits a request for data, or a data set, to a remote system, such as a remote partition. Generally, application 404a transmits requests to remote systems as if it were communicating with local memory, while application 404b transmits requests via the connection API 406, which would normally transmit data via communications sockets 408 (e.g., using a communications stack 410, such as COOP, LIO, TCP/IP communication modules as shown).

The block diagram can, for example, correspond to an interconnect arrangement for a guest partition within the para-virtualization system of FIGS. 1-3, above. In the embodiment shown, for communication to another partition within a para-virtualization system as discussed herein, applications 404a-b connect to interconnect projections 412. The interconnect projections 412 provide a pass-through of an interconnect API instantiation 414 by the operating system 400 (for application 404b, via the communication API 406). The interconnect API instantiation 414 in turn exposes functions provided by the interconnect API specification 416, which defines the interface to an interconnect or memory layer 418. The interconnect API instantiation 414 provides the physical and logical structures required to implement the interconnect API, for example by instantiating memory structures required to manage data transfers among partitions, as well as to support the commands exposed by the API specification 416. In some embodiments, the interconnect API instantiation 414 includes one or more drivers used to support data exchange between the operating system 400 and associated hosted system 402 and any external partitions, such as those that may share memory or be interconnected to the hardware resource hosting the operating system 400, such as via the interconnect or memory layer 418. In an example embodiment, the interconnect API instantiation 414 includes a queue pair architecture useable to schedule direct memory access operations between cores and shared memory, or between partitions on the same host system or different host systems. Such an arrangement is illustrated in FIGS. 8-9. In addition, the interconnect API instantiation 414 includes interconnect firmware managed by a service partition provided across each of the host computing systems to support the drivers that are installed in association with each of the guest partitions.

The API specification 416 defines a plurality of callable functions allowing a given partition to instantiate a connection to another partition as well as schedule data communications between partitions. It is noted that, despite the fact that various possible interconnections are available as part of the interconnect or memory layer 418, common functions are generally available for accessing or transmitting data at a same host computing system or on a different computing system within a network of host computing systems, without requiring that the hosted system 402 or operating system 400 be exposed to details of the interconnect and memory layer 418.

In example embodiments, the API specification 416 defines three general classes of interconnections: an internal interconnect, used to communicate among applications to perform functions to create a system, an external interconnect to communicate to system peripherals (e.g., disk) and external networks (e.g., Internet, systems outside the para-virtualization system), and a local interconnect used by physical interfaces and transparent to the applications executing on the various partitions.

The API specification 416 includes a library with which calling applications can execute various functions, an example listing of which is provided below. It is noted that, because the different host computing systems may be required to transfer address values for such direct memory accesses either within the same host system or different systems, different names are used for different functions based on the connection destination of the particular message.

Referring to FIGS. 8-9, two example implementations of functional interconnections among partitions in one or more host computing systems are shown. In particular, FIG. 8 illustrates a first host computing system 500 depicting functional interconnections among partitions in a single host computing system, while FIG. 9 depicts an arrangement of host computing systems 600, including two communicatively interconnected host computing systems 500a-b, illustrating functional interconnections among partitions across communicatively interconnected host computing systems.

In the embodiment shown in FIG. 8, host computing system 500 includes a service partition 502, as well as a plurality of partitions 504a-c supported by the service partition 502. In example embodiments, the partitions 504a-c can correspond to a control partition 14, I/O partitions 16,18 or guest partitions 24-28. In the embodiment shown the service partition 502 includes local interconnect firmware implementing connection tables 506a-c, each of which define interconnections among partitions. For example, each of the connection tables 506a-c can be associated with a separate supported partition 504a-c, and define the local interconnect support provided by the service partition 502 for that other partition 504. In particular, connection tables 506a-c can define the memory space mapping associated with a particular partition, allowing for direct memory access into that partition by another partition using a different virtual or physical memory mapping.

Within each partition 504a-c, a pair of queues 510a-b is instantiated for each interconnection to another partition, thereby providing bidirectional communication of virtual and/or physical addresses required to provide for direct memory access operations between partitions. This pair of queues 510a-b is associated with an application 512 at each partition, and performs message send and receive operations for all transfers between two applications 512, and reflect work requests from the sending application. In each pair of queues 510a-b, a first queue 510a is a send queue that includes the work request. The application 512 in that associated partition 504 transmits a DMA/RDMA request to the queue 510a, and receives data from the queue (received from far end queue 510 in another partition to which connection is made. A second queue 510b is a completion queue, and tracks completion status of DMA/RDMA requests.

Interconnect firmware 514 resides between the pairs of queues 5100a-b of interconnected partitions (e.g., partitions

504a/504c, or 504b/504c). The interconnect firmware 514 maintains a registration of memory, and performs virtual address and physical address translations as needed for translation/connection tables 506a-c. Additionally, drivers 516 included in each partition 504a-c supported by the service partition 502 allow for translation of the work requests to a format useable by the interconnect firmware 514, by providing transforms of requests as needed. In addition, interconnect firmware 514 provides security features that may be required for communication of data between host systems. For example, for data transmitted to a remote host system, the interconnect firmware 514 can selectively apply encryption and/or data splitting operations to that data to improve its resiliency and security during transmission.

In addition, in the embodiment shown one or more IC cards 518 can be associated with the host system 500, and can be used to interconnect to an external system, such as a disk, network card, or other component not allocated to the partitions 504a-c.

In comparison to FIG. 8, FIG. 9 illustrates an analogous arrangement 600 that includes a plurality of host computing systems 500a-b, each of which hosts its own service partition 502a-b, respectively. The service partitions 502a-b monitor connections associated with the partitions on those respective host computing systems 502a-b, with service partition 502a including connection tables 506a-b associated with partitions 504a-b, and service partition 502b including connection table 506c associated with partition 504c.

In this embodiment, host systems 500a-b are communicatively connected by IC cards 518, which provide a communicative interconnection between memory systems of the host systems 500a-b. Accordingly the queue pairs 510a-b of each partition can be interconnected across IC cards 518 and any associated routing equipment (e.g., switch 602 or other routing equipment) used to interconnect host systems. In this arrangement, each queue pair 510a-b can be associated with a particular port, such that a partition having access to a particular IC card 518 can communicate with other partitions via a port exposed by that IC card 518. Additional IC cards 518 can also be used as discussed above, for example for connection to external systems such as a disk, network card, or other computing system not allocated to a partition of the para-virtualization system discussed herein.

In general, and referring to the systems of FIGS. 6-9, the API illustrated herein, as implemented using the service partition 502, connection tables 506a-c, interconnect firmware 514, and queues 510a-b is designed to be used at the user level, allowing for the normal transfer operations to bypass kernel calls by operating systems in each partition, thereby ensuring low latency. In other words, memory addresses used in the messages are the application's virtual address and translations to physical addresses are done by the hardware/firmware.

As discussed below, the messages included in queue pairs 510a-b can correspond to verbs, defining commands to be performed relative to DMA/RDMA operations across partitions. In accordance with the present disclosure, memory addresses used in the verbs are first registered, allowing the interconnect firmware and drivers to 'pin' the memory pages and create any translate tables needed by the hardware. Therefore the process of registering a memory segment (and de-registering) may take a large amount of time and should be done by the application during initialization and teardown of that partition, if possible. It is noted that, in embodiments where the operating system associated with a particular partition 504 limits the number of pages that may be 'pinned', the application 512 in that partition may see better performance by copying data buffers in an un-registered memory region to a registered memory region rather than doing a register/de-register of the new memory block.

It is noted that, in the comparison of FIGS. 8 and 9, the API calls do not change if all partitions were in the same host computing system or different host computing systems 500a-b. The difference would be managed by the interconnect 514, which would use a memory to memory transfer to transport the data in the arrangement of FIG. 8, rather than using a physical wire as in FIG. 9.

Furthermore, although in each of FIGS. 8-9 a single queue pair is illustrated for each partition, it is understood that the queue pair arrangement is effectively a bidirectional, point-to-point connection; accordingly, if a partition is to communicate with other partitions, multiple queue pairs could be used.

III. API for Low-Latency Interconnect Among Partitions, Partition Management

Figure 10:
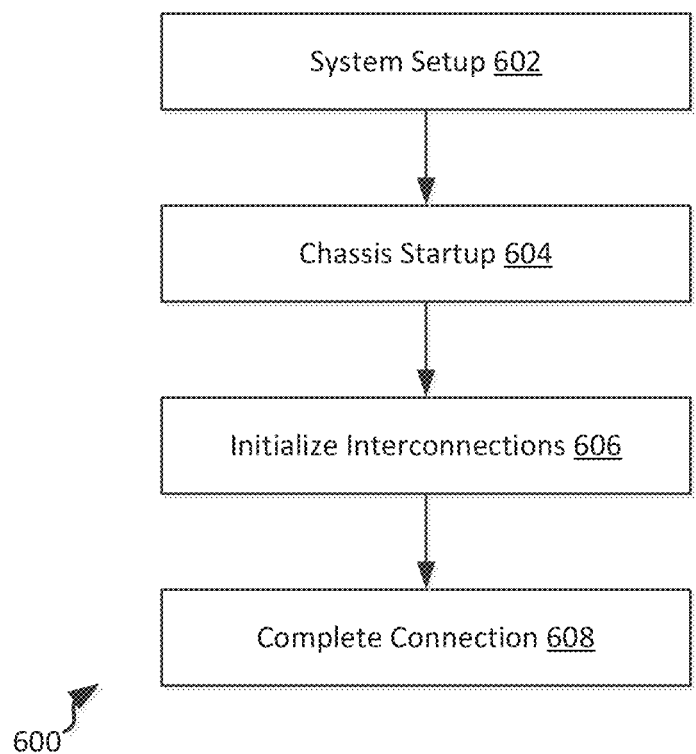
FIG. 10 is a flowchart of an example method for instantiating a set of partitions within a para-virtualization system as discussed herein, according to an example embodiment.
Figure 11:
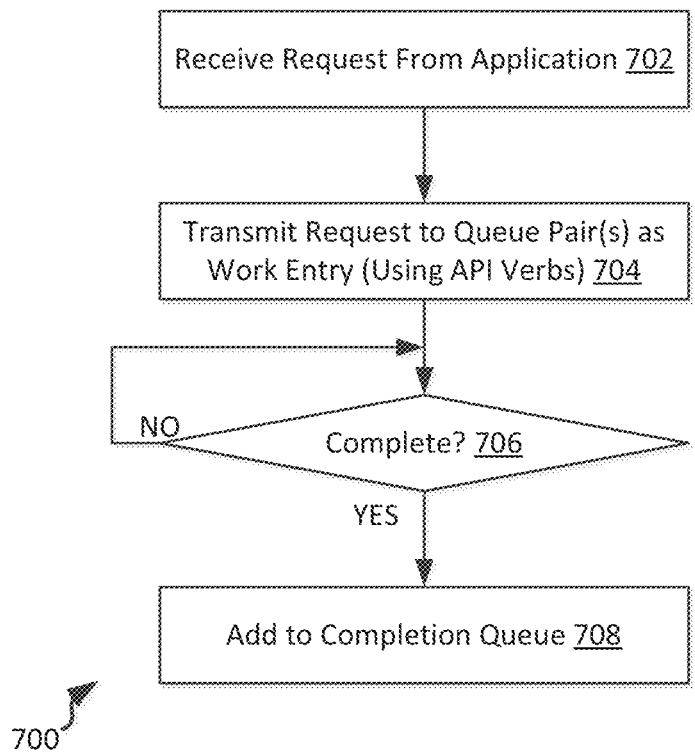
FIG. 11 is a flowchart of an example method for utilizing an application programming interface for interconnect of a plurality of partitions within a para-virtualization system as discussed herein, according to an example embodiment.

Now referring to FIGS. 10-18, methods of instantiating and using various types of partitions are described. In particular, FIGS. 10-11 illustrate methods for instantiating partitions and utilizing an API for inter-partition communication. The methods illustrated in FIGS. 10-11 can be performed in a para-virtualization system as discussed herein that includes two or more partitions as explained in Section I, and can be implemented on one or more host computing systems as discussed in Section II, above.

FIG. 10 is a flowchart of an example method 600 for instantiating a set of partitions, according to an example embodiment. The method 600 is instantiated at a system setup operation 602. The system setup operation 602 corresponds to initial arrangement of one or more host systems, for example at one or more locations such as are illustrated in FIG. 4, above. A chassis startup operation 604 corresponds to initialization of each host computing system 10, for example establishing communicative interconnections if two or more such host computing systems are used. The chassis startup operation 604 can also perform instantiation of the various partitions as discussed above in connection with FIGS. 1-3, including command, control, service, and guest partitions as desired for a particular configuration.

An interconnection initialization operation 606 initializes an interconnect firmware that exposes an interconnect API to application software resident within the instantiated partitions. The interconnection initialization operation 606 can correspond for example, to distribution and installation of drivers at each partition, as well as instantiation of queue pairs for each anticipated partition interconnection associated with that partition. The interconnection initialization operation 606 can further include tracking memory addresses and other resource information in connection tables associated with a supporting service partition on the host computing system affiliated with the partition being instantiated and registered.

A connection completion operation 608 corresponds to completed initialization of the partitions and API (and associated firmware) used for inter-partition communication that avoids use of kernel calls or otherwise avoids use of additional interconnect layers (e.g., bypassing sockets as illustrated in FIG. 6) that would introduce additional latency in data exchange (particularly among co-located partitions on the same host system). Upon reaching the connection completion operation 608, the various partitions included in a system can initiate data transfers, for example using the verb-based commands exposed by the API and discussed below in connection with FIG. 11.

Referring now to FIG. 11, a flowchart of an example method 700 for utilizing an application programming interface for interconnect of a plurality of partitions is disclosed. The method 700 can be invoked by the interconnect firmware 514 of FIGS. 8-9, interconnect API 304 of FIG. 6, or API specification 416 of FIG. 7, in various embodiments. The method 700 includes a request receipt operation 702, which includes receiving a request from an application within a partition. The request can take any of a number of forms, but typically corresponds to a typical data request issued by an application to a remote system, such as may be invoked in a client-server or other type of data retrieval relationship. The request is provided to a queue pair, such as queue pair 510a-b associated with the partition. The request is entered as a work entry, and defined in terms of one or more verbs supported by an API specification.

The work entry can take any of a number of forms. For example, the work entry could be a request for data, could be a data fulfillment work entry, or could be a notification of some system or application event or error. If the work entry included in a queue of a requesting partition is a request, the work entry in the partition fulfilling the work entry would be a data response. Accordingly, although queues are typically dedicated to a particular port and associated far-end partition, each partition could track its fulfillment of each work entry in its own queues independently of the paired partition. It is noted that send and DMA/RDMA transfers use the same verb to start the operation and require about the same number of instructions to setup the work entry. The main difference is that the receive side, for a send operation, is required to post a receive buffer for the transfer to take place. For a RDMA transfer, the receive side does not use a receive buffer (unless there is immediate data that is also transferred). It is up to the requesting application to determine the size of any receive buffers that are posted and the use of DMA/RDMA transfers versus send transfers. Note that on the receive side of a DMA/RDMA write, because no receive buffers are used that would generate a completion entry, the receiver will need some other way of being informed that the transfer has completed (poll memory, send message, other).

In addition to data send/receive requests, a number of other types of verbs are exposed by the interconnect API and can be used in such work entries. For example:

Initialization Verbs: One or more initialization verbs can be used, including those required to open an access layer and allow allocation of resources and tables for a partition, retrieve error strings, query an access layer, or set various debug parameters. Further verbs could be used to read performance monitor counters associated with an instantiated queue pair to monitor data communication statistics. Still further verbs can be used to query a partition name, query local ports visible to a partition and remote ports allowed to connect to the partition (e.g., used interconnection ports for interconnection of host systems, such as at I/O cards 518), register memory associated with a particular partition for use with DMA/RDMA accesses via a queue pair, or create queue pairs for a particular partition, or associated with a particular local port. Other verbs could be used to register such queue pairs for use, indicating that the queue pair is available for use by an application. Still further verbs could be used to inform a remote queue pair that a named queue pair is available and ready to accept messages.

Data Flow Verbs: One or more data flow verbs could also be provided by the interconnect API, for example to initiate data transfers among partitions. A post send verb posts a message or DMA/RDMA request to a queue pair to be performed. A post receive verb can be used to provide receive buffers to receive data to be provided in response to a request. A poll completion queue verb allows for polling of the completion queue (e.g., queue 510b) to obtain one or more entries from that queue.

Tear Down Verbs: One or more verbs could be used to deallocate various queues and connections among partitions, for example, a deregister memory region verb would deregister a memory region from a domain, thereby ensuring that DMA/RDMA operations are not performed on that memory region. A destroy completion queue verb removes a completion queue and frees those resources for use by other portions of a partition. Similarly, a destroy queue pair verb would destroy both the completion queue and the request queue (e.g., queues 510a-b). A deallocate protection domain verb would release a protection domain, once registered memory regions and queue pairs associated with that protection domain are removed. A close access layer verb could also be used to terminate open links to remote connections, and informs remote connections that the links are terminated. A port reset verb could reset a local port, clearing queue pairs, protection domains, and memory registrations associated with a particular port.

Structure: One or more structures could be implemented and monitored to create or destroy various structures used in connection with the interconnection firmware. A port information structure contains port information required to create queue pairs associated with a local link. An interconnection information structure includes information associated with available remote queue pairs that are registered and available to the querying partition. A queue pair settings structure maintains settings required to create a queue pair, such as queue depth and ordering. A work request status structure can be used to contain data to be retrieved from a completion queue, and determines whether a particular work order (e.g., based on a data request) has been completed. A work request type structure monitors types of work requests, which can include, for example, a write send, DMA/RDMA write, DMA/RDMA read, write receive, or other types of work requests. A still further structure maintains an enumeration of possible work order statuses, such as success, local error, remote access or remote operation errors, or bad response error indications. A work request structure can include a work request identifier and type, as well as data and a pointer to data describing a length and structure of an RDMA transfer. A corresponding work request structure could be used for a receive operation, indicating receipt of a particular work request (e.g., by work request identifier).

In addition to the above, additional structures can include a data segment entry structure describing the memory address and length of a block of memory to be transferred by a work order. A flags structure indicates options that can be used in a send request (e.g., immediate, signaled). Performance monitor structures, as well as structures about a remote port (e.g., the remote handle used to create a queue pair) are instantiated as well.

Callback Routines: A set of callback routines can also be defined, and allow an application to handle asynchronous events without requiring polling. This may include, for example, operations such as determining whether something has been added to a completion queue, or other types of events, such as rarer changes to configurations. The callback routines can include a completion queue callback which notifies when something is added to a completion queue, a doorbell callback, a destroy callback (used to confirm when queues or other structures are destroyed), or link pair request or acceptance callbacks. In general callbacks include a pointer to a structure associated with the callback, as well as the user-supplied callback.

It is noted that the verbs and structure described herein are managed as an interface between a particular partition and any data external to that partition; in other words, a workload in a partition may issue a data request in the form of a memory access external to that partition (either on the same host system or a different host system). Drivers that are included with the partition when setting up the API and its associated interconnect instantiation structures (e.g., queues, connection tables, etc.) receive such data requests and route the requests in a manner transparent to the partition, such that the request, from the perspective of the partition, is treated the same regardless of where within the overall partitioned system the data request is issued.

Referring back to FIG. 11, a completion operation 708 determines whether a work entry included in a queue (e.g., queue 510*a* of queue pair 510*a-b*) has completed, and if so adds that work entry to a completion queue (e.g., queue 510*b*) at each end of an interconnected arrangement of partitions.

Figure 12:
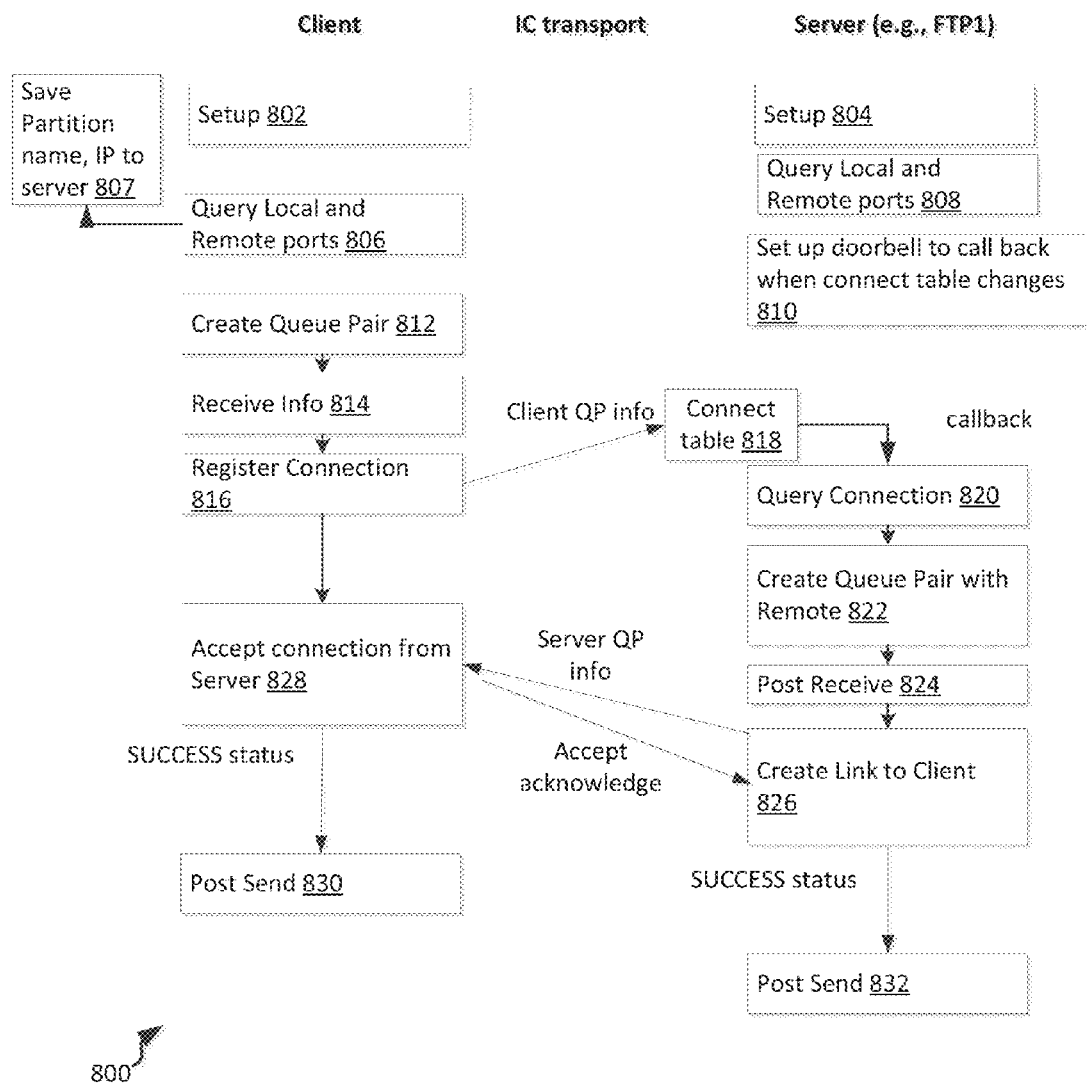
FIG. 12 is a flowchart of an example partition setup and management process, according to an example embodiment.

FIG. 12 is a flowchart of an example partition setup and management process 800, according to an example embodiment. The process 800 generally corresponds to use of the verbs described above in connection with FIG. 11 to establish a client-server relationship between two partitions to initiate a DMA/RDMA transfer. This can be performed for example, in the case of a database server service used in connection with a client guest partition, as discussed in further detail below in connection with FIGS. 19-22.

As illustrated in process 800, a client and server partition perform setup tasks 802, 804, respectively. Both the client and server partitions then call verbs to query ports and query remote ports (at operations 806, 808, respectively), thereby learning the ports that are available locally and remotely. The client saves its partition name and address at the server at operation 807, so the server knows that the client is seeking connection with the server. The server sets up a callback routing when a connection table changes at operation 810, and the client then creates a queue pair at operation 812.

In the embodiment shown, the client receives information about the queue pair at operation 814, and registers its connection at operation 816 and associated memory useable for DMA/RDMA transfers. The client updates a connection table at operation 818 to indicate that the client is capable of receiving connections from the server. This triggers the callback operation set up at operation 810. The server queries the connection, and creates a queue pair at operations 820, 822. The server performs a post receive operation 824, indicating that it is ready to receive requests. The server transmits its queue pair information to the client at operation 826, and the client accepts the connection from the server and transmits its acknowledgement at operation 828. Both the client and server can then post send requests, exchanging data at operations 830, 832, respectively.

It is noted that in FIG. 12, not all calls are shown: for example, calls that may wait for events to occur some type of polling or a callback routine could be used to detect that the event occurred are not shown, and may only occur in some cases. If polling, some actions are not completed until the call is made when the data is available (e.g., transmitting an acknowledgement only after a next link pair acceptance). Furthermore, various other interconnection methodologies or sequences could be used in alternative embodiments or example implementations.

IV. Example Partition Arrangements

Referring to FIGS. 13-18, a series of example partition arrangements are disclosed that illustrate example combinations of partitions (usually guest partitions) that might be used in a para-virtualization system such as the one disclosed herein, and which can implement the low-latency interconnect API to quickly share data among computing systems in an efficient, flexible, and fault-tolerant manner.

Figure 13:
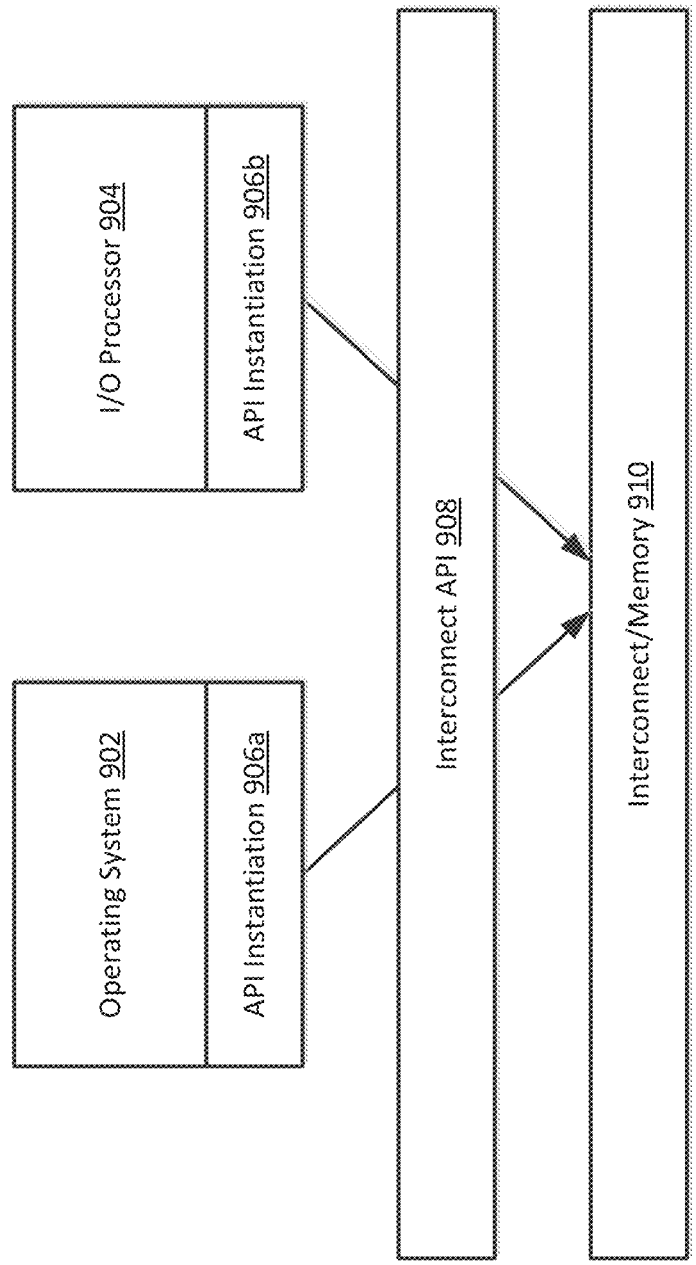
FIG. 13 is an example block diagram illustrating interconnection of a plurality of partitions including a guest partition and a services partition providing I/O operations, according to an example embodiment.

FIG. 13 is an example block diagram illustrating a portion of a virtualized system 900. The virtualized system 900 includes interconnection of a plurality of partitions including a guest partition 902 and a services partition 904 providing I/O operations, according to an example embodiment. Each of the partitions 902, 904 are instantiated using an API layer 906*a-b*, respectively, and connect to interconnect firmware, shown as the interconnect API 908. The interconnect API 908 provides a transparent connection to the interconnect or memory layer 910, irrespective of whether the partitions 902, 904 reside on the same host system or different host systems.

Figure 14:
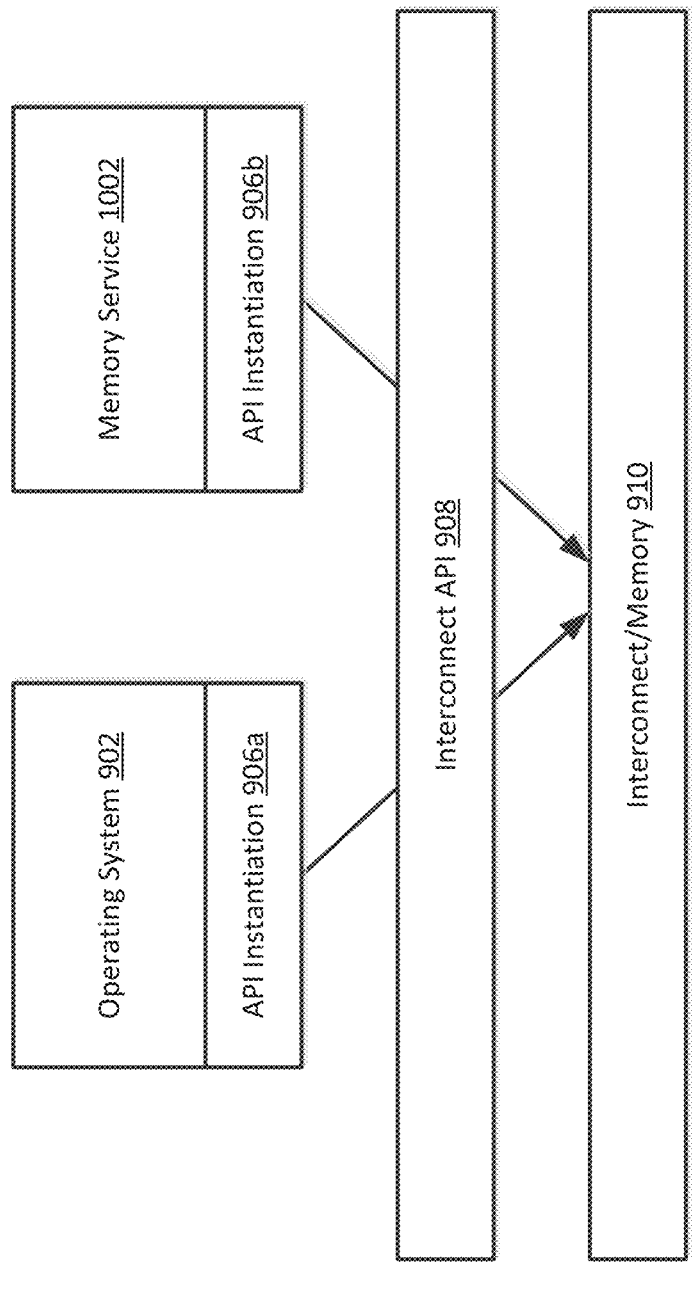
FIG. 14 is an example block diagram illustrating interconnection of a plurality of partitions including a guest partition and a services partition providing data service operations, according to an example embodiment.

FIG. 14 is an example block diagram illustrating a portion of an alternative virtualized system 1000. Virtualized system 1000 includes a plurality of partitions including a guest partition 902 and a services partition 1002 providing data service operations, according to an example embodiment. In this embodiment, the services partition 1002 can correspond to a data service, and can be allocated across one or more host computing systems. In addition the data service can be allocated sufficient memory to ensure that a data service, such as a database management system and associated data storage space, can be entirely held within system memory, thereby ensuring improved performance relative to disk-cached database systems. Example data services are discussed in further detail in connection with FIGS. 19-22, below.

Figure 15:
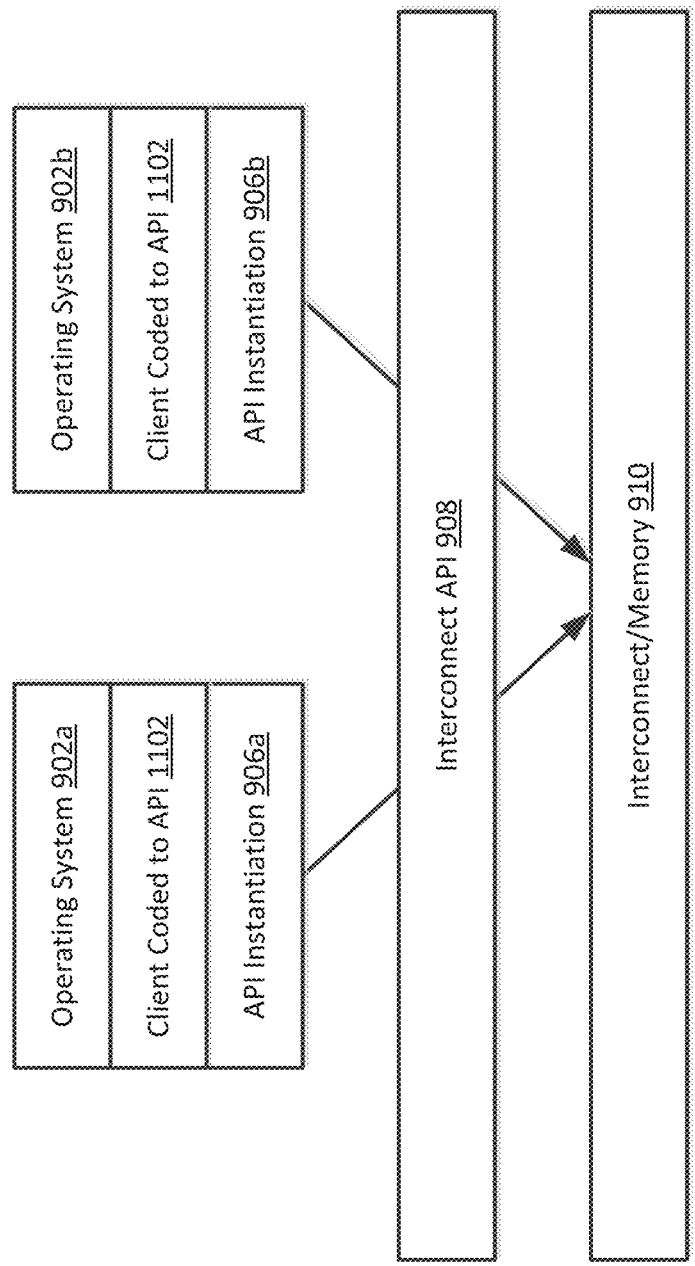
FIG. 15 is an example block diagram illustrating interconnection of a plurality of partitions including a plurality of guest partitions, according to an example embodiment.
Figure 16:
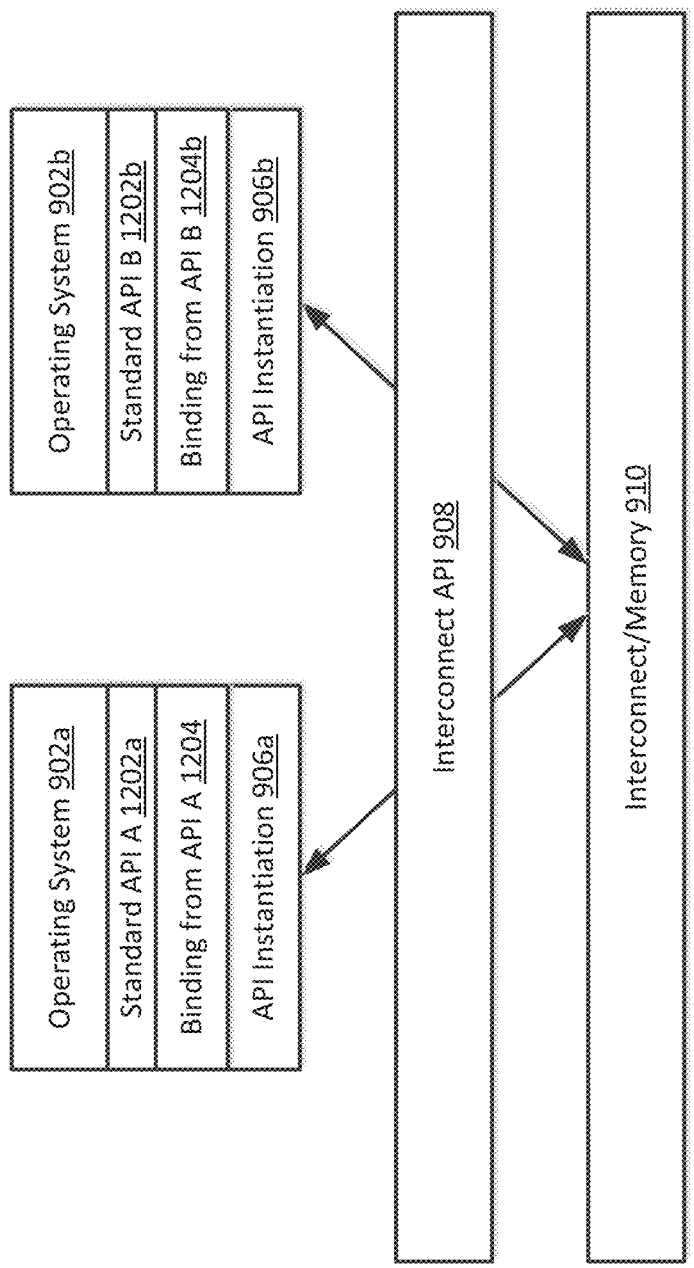
FIG. 16 is an example block diagram illustrating further details of interconnection of a plurality of guest partitions, according to an example embodiment.

FIG. 15 illustrates a further example portion 1100 in which operating systems of guest partitions 902*a-b* are written for a particular low-level access standard, for example to use file access commands for local system memory. A client coded API 1102 can be included within each partition associated with the operating systems, and can translate those OS-specific commands to commands recognizable to the API instantiation local to that partition 906*a-b*, which in turn, again, utilize interconnect API 908 to provide a transparent layer over the interconnect or memory layer 910, irrespective of whether the partitions 902, 904 reside on the same host system or different host systems. Similarly, in FIG. 16, a standard API different from the API instantiation, shown as standard API 1202, can be accounted for by including a binding 1204 (e.g., translation and associated data structures) tying the standard API 1202 to the API instantiations 906*a-b* at each of the partitions. As illustrated, operating systems 902*a-b* support different standard APIs, so different binding s would then be used to the common API instantiations 906*a-b*.

Figure 17:
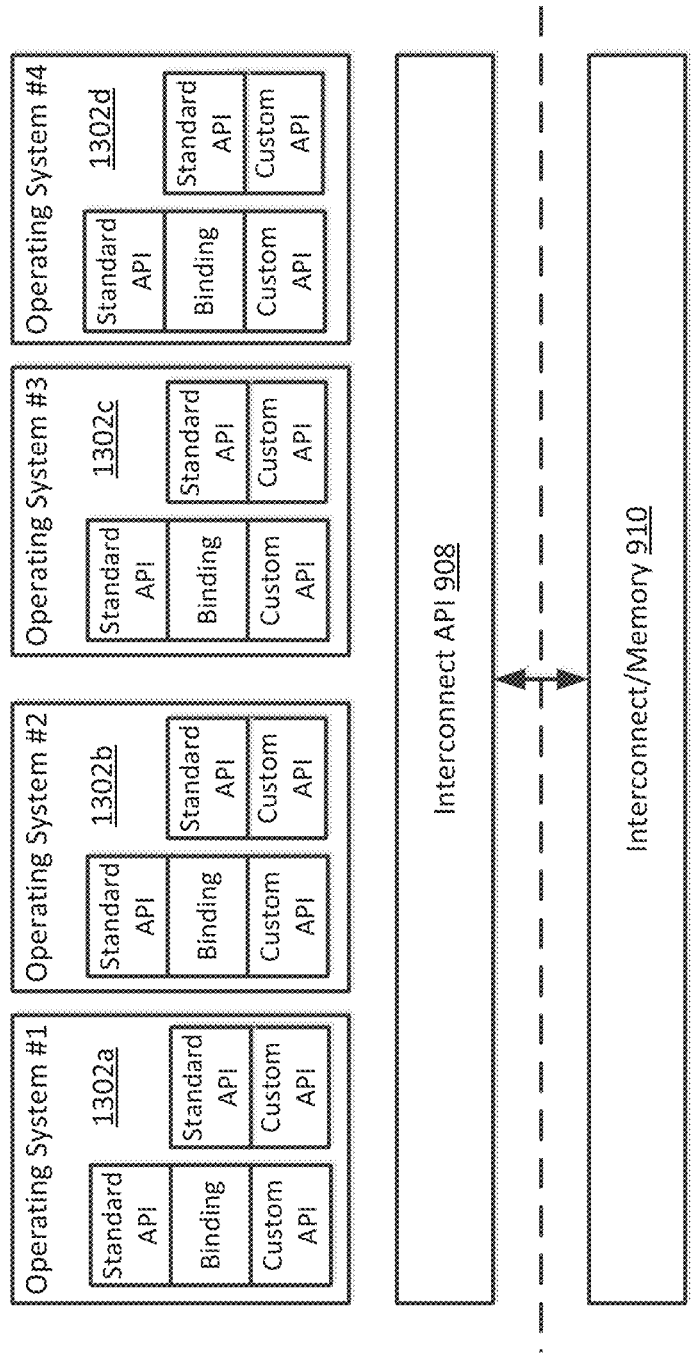
FIG. 17 illustrates an additional alternative of interconnection of a plurality of guest partitions in a para-virtualization system, according to an example embodiment.
Figure 18:
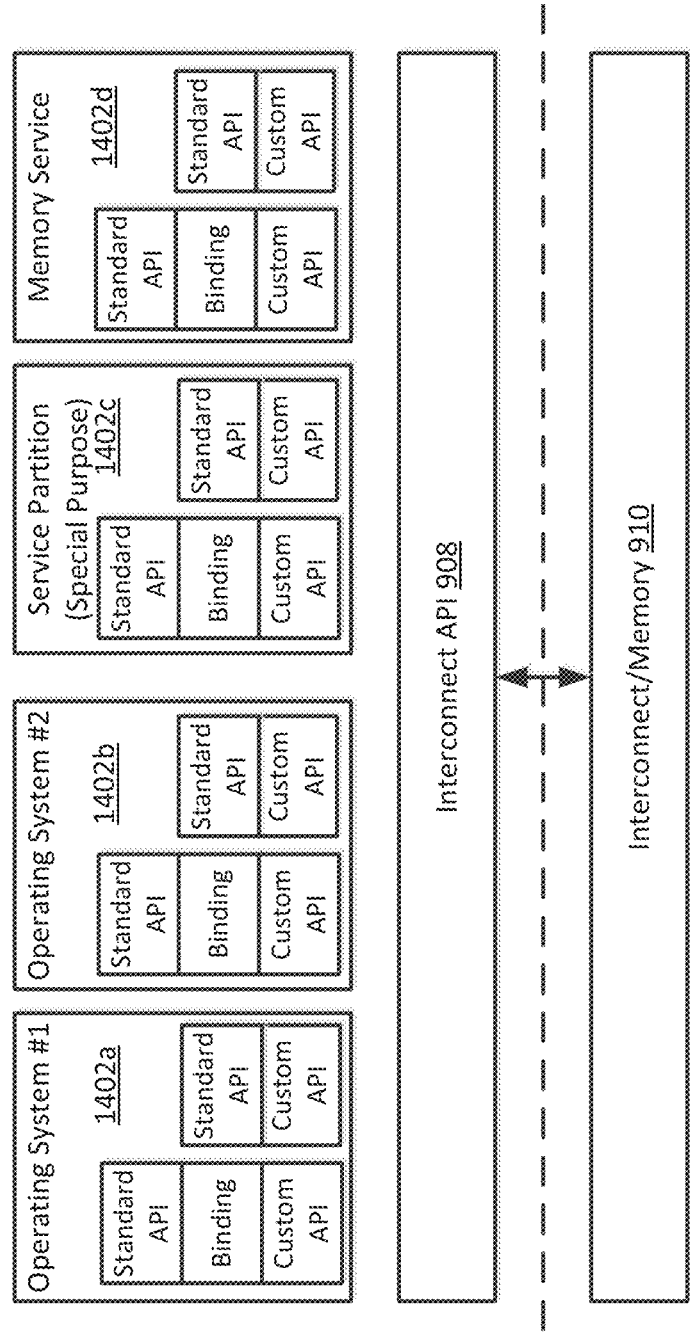
FIG. 18 illustrates an additional alternative of interconnection of a plurality of guest and service partitions in a para-virtualization system, according to an example embodiment.

FIGS. 17-18 illustrate similar concepts. In the example of FIG. 17, a series of partitions 1302*a-d* are provided which may access any of a number of standard APIs. Those APIs may be compatible with the custom API instantiation required to connect to interconnect API layer 908 and the interconnect or memory layer 910. Additional APIs may require a separate binding layer, as noted in FIG. 16. Accordingly, each of a plurality of APIs available to a particular operating system could be used to interconnect to any of the other partitions 1302*a-d* using the interconnect API 908 (i.e., using DMA/RDMA access via queue pair requests, as explained above). As illustrated in the arrangement 1400 of partitions 1402a-d in FIG. 18, this is also the case for various service partitions that may provide, for example data services, I/O services, or other types of special purpose services which require frequent requests from guest partitions (e.g., partitions 1402a-b).

As illustrated in FIGS. 13-18, the interconnect API allows partitions to be abstracted from the manner in which they are interconnected. For example, although partitions may believe that they are connecting using a particular virtualized type of connection (e.g. a network connection, serial connection, etc.), in fact the interconnections are all via the interconnect API and associated interconnect or memory layer 910. Furthermore, use of the API allows operating systems within each partition to independently choose a supported API with which to interconnect, depending on the compatibility of that API with the underlying interconnect API or the existence of a compatible binding between APIs. Additionally, each of the partitions may be bound to the same interconnect or memory layer 910 despite the fact that each partition observes, or "believes" itself to be using a dedicated connection.

It is noted that, although a particular set of partition types are discussed in connection with the examples of FIGS. 13-18, other types of partitions could be used as well. For example dedicated file system or clustering services could be provided, in which disk operations to a particular set of disks could be allocated to collocated partitions, or partitions having similar types of workloads. Additionally, the transparency of the interconnect API provides some additional advantages across these partitions, regardless of type. For example, a common system time service or system management service could be provided in a partition and distributed transparently (as though in local memory) to the other partitions within the virtualization system. Additionally, coordinated diagnostic and licensing services (e.g., software license management and system debug), as well as partition imaging and restoration could be provided. Furthermore, since all partitions communicate as though directly interconnected by memory, a flexible clustering and local database or file system management scheme could be employed as well, with one or more partitions providing such services to other partitions within the system.

V. Example In-Memory Data Service Partition Across Hardware Resources

Referring now to FIGS. 19-22, example embodiments of a data service partition or set of partitions are illustrated. The data service partitioning disclosed herein represents one of a number of examples of special-purpose partitioning available by way of the virtualization systems disclosed herein.

Figure 19:
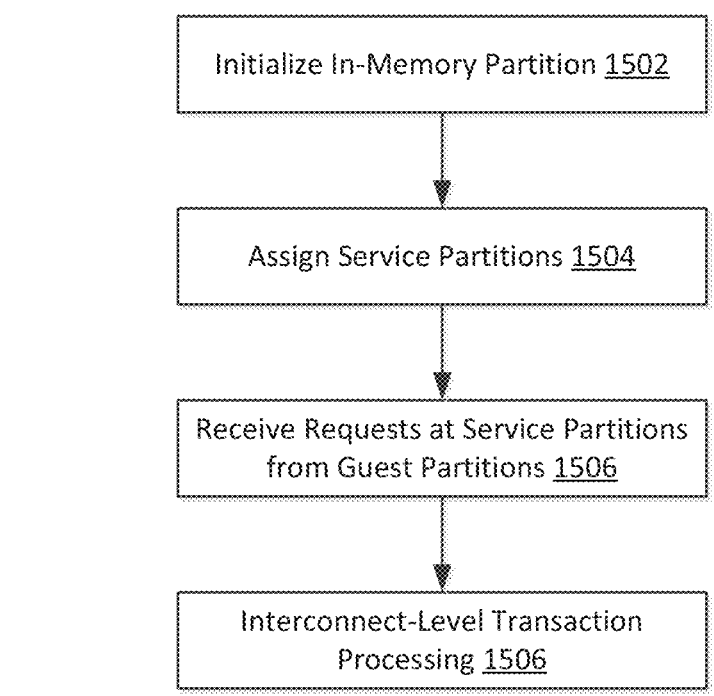
FIG. 19 is a flowchart of a method of managing a database instantiated in a service partition of a para-virtualization system, according to an example embodiment.
Figure 19:
Figure 20A:
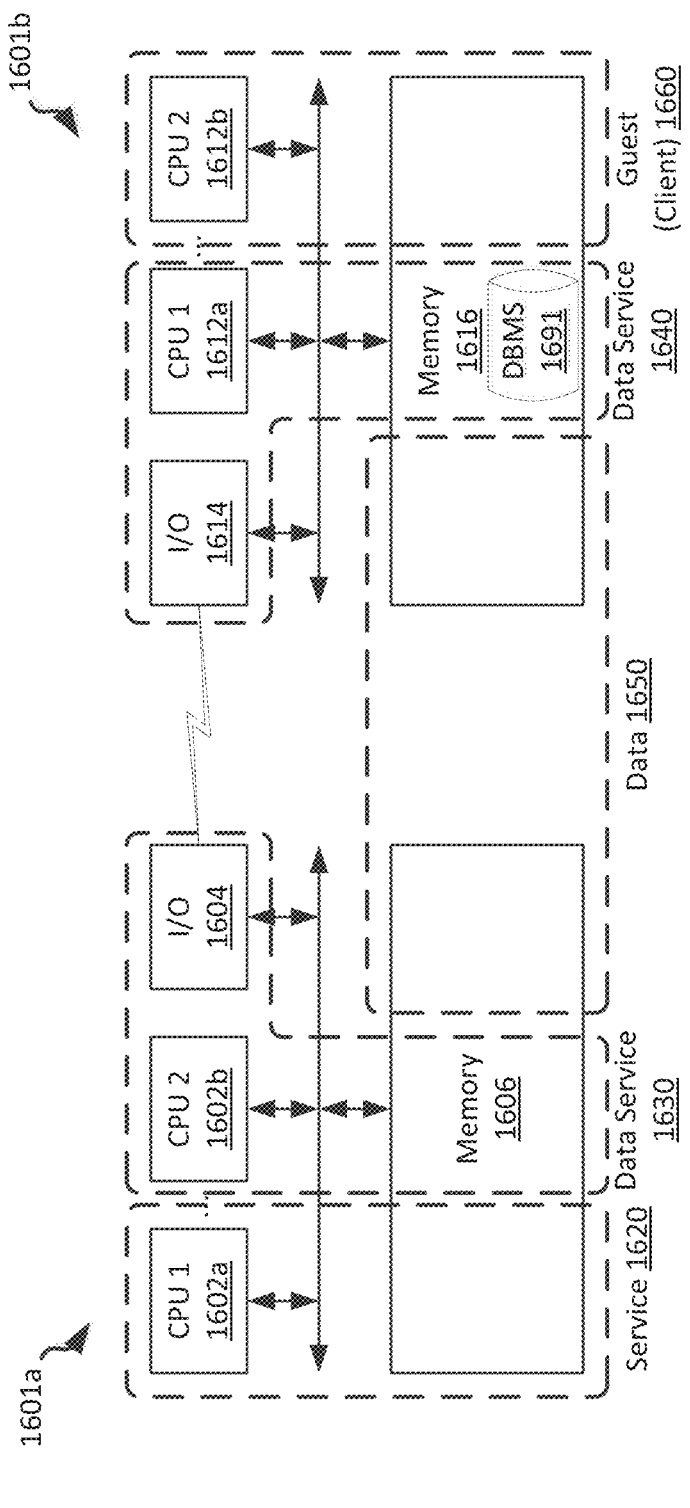
FIG. 20A is a block diagram illustrating an example allocation of hardware resources of a host computing system to one or more partitions including a data service partition.
Figure 20B:
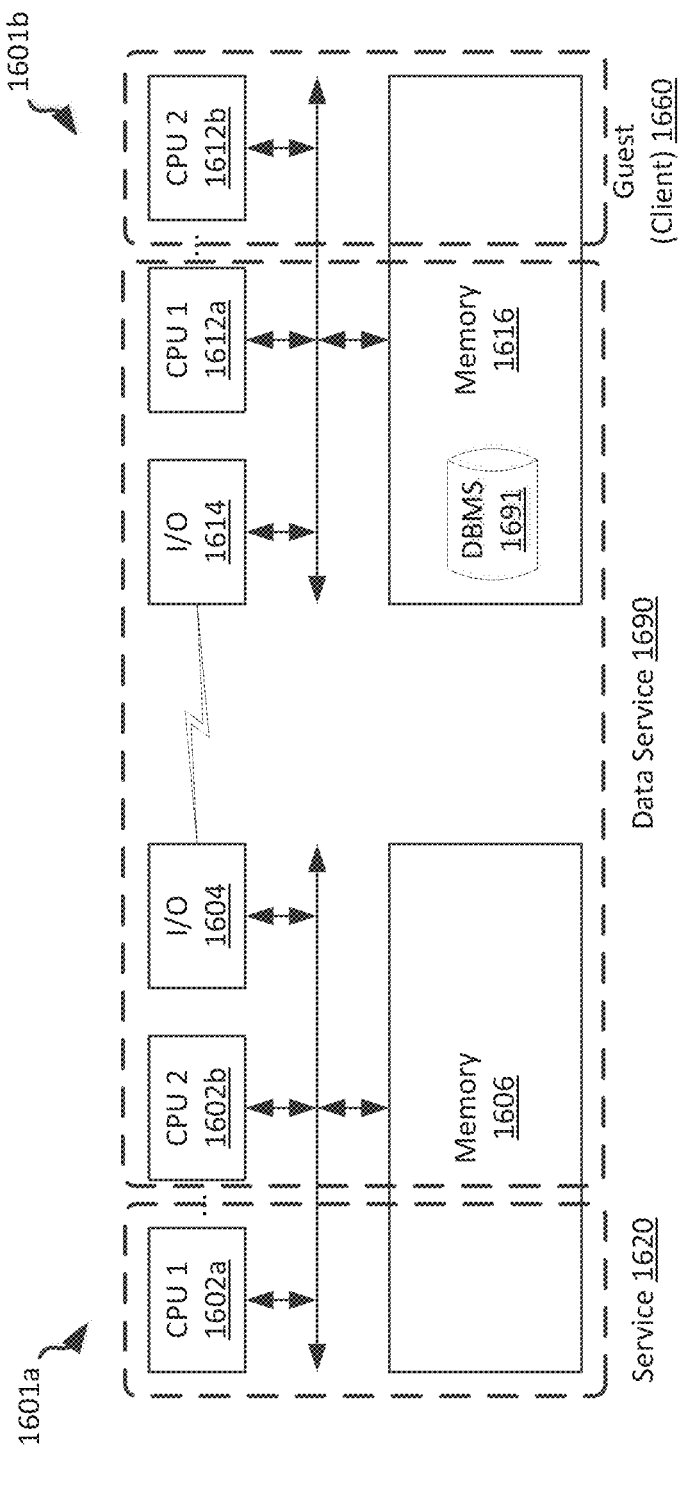
FIG. 20B is a block diagram illustrating an alternative example allocation of hardware resources of a host computing system to one or more partitions including a data service partition.
Figure 21:
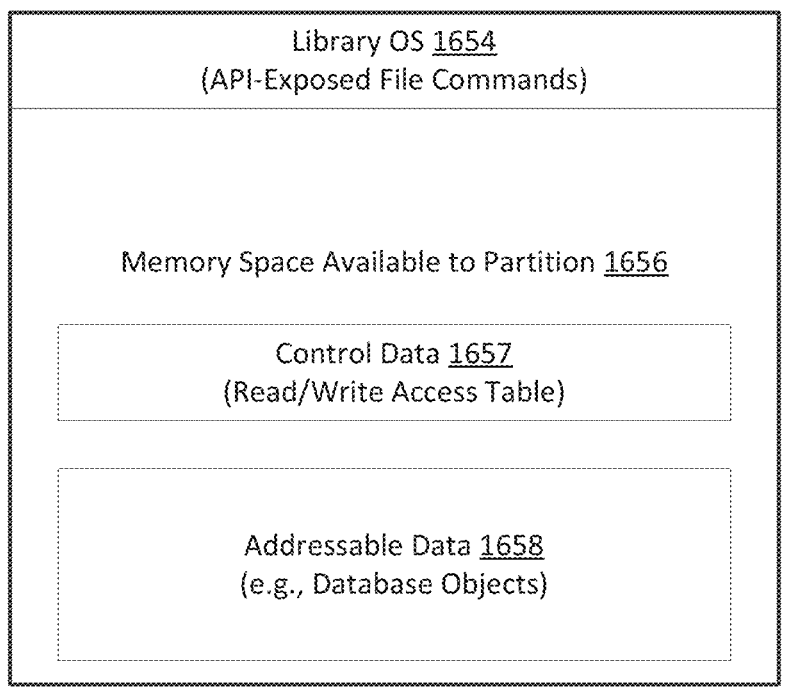
FIG. 21 is a block diagram illustrating an example arrangement of software within a data partition useable within a multi-partition system, according to an example embodiment.
Figure 22:
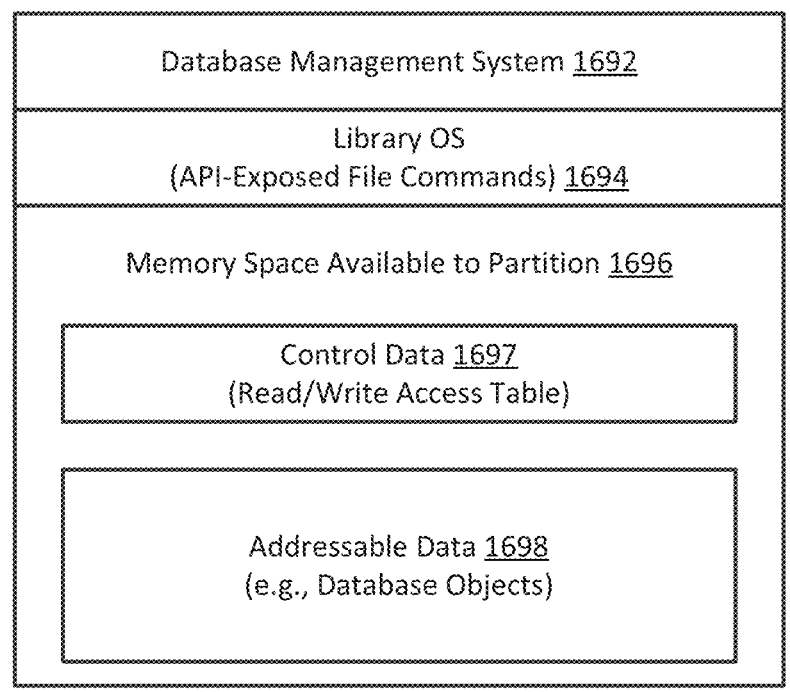
FIG. 22 is a block diagram illustrating an example arrangement of software within a database partition, according to an example embodiment.

In particular, FIG. 19 is a flowchart of a method of managing a database instantiated in a service partition of a para-virtualization system, while FIGS. 20-22 illustrate example allocations of hardware resources and partitions that could be used to implement such an arrangement. In general the data services discussed herein are contemplated to be located in a large-scale service partition providing data storage for database files in one or more host computing systems, thereby allowing a scalable allocation of system memory and/or processing resources useable to service various database transactions. The data services partition discussed herein can be accessed, for example, using the methodologies illustrated in FIGS. 10-12, above.

Generally, and as illustrated in FIG. 19, a method 1500 includes initializing an in-memory partition at operation 1502. This initialization can be in one or more host computing systems, and at a minimum includes an allocation of sufficient memory such that an entire database (and optionally additional components such as a database management system and/or underlying operating system) can be stored in system memory without storage to disk. In example embodiments, such partitions can be about 128 gigabytes up to the terabyte range, in which case typical host systems will require allocation of system memory from more than one host system. The method includes assigning service partitions at operation 1504 which corresponds to allocating one or more partitions to perform various portions of the database service. In one example embodiment, one or more service partitions may include system memory and one or more processing cores, while a second partition can contain simply system memory accessible by those trusted service partitions. In this arrangement, the data partition is only accessed by the data service partitions, which act as transaction request managers for the data partition. In an alternative arrangement, the data service and data are grouped within a common partition, as is typical with database management systems. Such examples are depicted and discussed in further depth below in connection with FIGS. 20A-B.

In connection with FIG. 19, requests can be received at the service partition or partitions that support data requests, at operation 1506. The service partitions can include one or more partitions used to service such requests, and which may be the same partition as where the data resides. In example embodiments, the service partitions can respond to the request using interconnect-level transaction processing at operation 1508. This can include initiating a DMA or RDMA operation from the data partition to the client partition, thereby providing the data to the client partition at memory-copy speed. It could also include, in the alternative, simply providing to a requesting partition (e.g., a client system implemented in a guest partition) a pointer to data stored in the database, thereby avoiding the requirement of having to effect a transfer of the data to the client partition entirely. Which option is selected is primarily a choice of implementation of the data service.

Referring now to FIGS. 20A-B block diagrams illustrating example allocations of hardware resources of a host computing system to one or more partitions including a data service partition are shown. In FIGS. 20A-B, two host computing systems 1601a-b are illustrated, each including a plurality of processing cores (central processing units (CPUs) 1602a-b, 1612a-b, respectively), I/O systems (1604, 1614, respectively), and system memory (1606, 1616, respectively). In accordance with the present disclosure, the resources available in these host systems 1601a-b can be allocated in a variety of ways.

In FIG. 20A, a service partition 1620 is allocated CPU 1602a and a portion of memory 1606, while a data service partition 1630 is allocated CPU 1602b, I/O system 1604, and a portion of memory 1606. Similarly, a guest partition 1660 is allocated CPU 1612a and a portion of memory 1616, while a data service partition 1640 is allocated CPU 1612b, I/O system 1614, and a portion of memory 1616. In this arrangement a data partition 1650 is allocated system memory distributed across host systems 1601a-b.

In contrast, in FIG. 20B, a service partition 1620 is allocated CPU 1602a and a portion of memory 1606, guest partition 1660 is allocated CPU 1612a and a portion of memory 1616, but a data service partition 1690 includes all of CPUs 1602b/1612b, I/O systems 1604/1614, and a portion of memories 1606,1616.

In use, the arrangement of FIG. 20A may provide distributed database transaction processing, with both of data services 1630, 1640 servicing database requests from client partitions, such as partition 1660. Data partition 1650 cannot service data requests on its own, as it was not allocated a CPU, and instead relies on external partitions to manage access to that data. In connection with this arrangement, FIG. 21 illustrates data partition such that it includes a "library operating system" 1654, which represents exposed file access commands that can be called externally, but do not generally execute absent being called. Such a library operating system (OS) 1654 may implement commands to access memory space included in the data partition 1650, including control data 1657 (e.g., indicating current ownership and/or locks on particular data space by a database management system or client partition) and addressable data 1658. In such an arrangement, the data partition may utilize a queue pair associated with a database service partition (e.g., partitions 1630, 1640) to service the data to communicate with client partitions in response to data requests.

In contrast, in FIG. 22, data services partition can include data services software 1692, such as a database management system 1691, and which could call library OS 1694 to access the available memory space 1696, including control data 1697 and addressable data 1698. In either arrangement, the data partitions are allocated by a control partition (e.g., by way of a management server discussed below) such that the addressable data portion 1698 is of adequate size to contain the entire database. It is noted that the database can be distributed between two or more host systems in an arrangement that is transparent to and not managed by the database management system 1691 installed at the database services partitions (e.g., partitions 1630, 1640, 1690).

In connection with FIGS. 20A and 21, it is noted that more than one or two data service partitions could be used in connection with a particular data partition 1650, in various embodiments, and that the data service partitions (e.g., partitions 1630, 1640) could take on particular roles. For example, one or more partitions could be used as a database query handler designed to strictly request data from the data partition 1650; in this case, such database query handlers would not be required to "own" such memory, since it would be recognized that no writes to the data partition would be required (other than audit logs, which could be stored in or staged in the data service partition for later storage). Such data query partitions could also be used, for example for special purpose operations, such as periodically obtaining a snapshot of the database to be stored to disk via I/O systems 1604/1616, or to be transferred to a remote partition. Such snapshots could be easily used for rollback of the database if required.

Additionally, in some embodiments the data query partitions could generate a periodic snapshot of the database tables and data (e.g., every 5 minutes, or some other period). The data storage service partition(s) could then coordinate with database query partitions in the event a rollback or restore of the in-memory database maintained in the data partition 1650 would be required; such snapshots, whether stored to disk or otherwise captured, could be restored in the data partition 1605 by a data storage service partition.

Concurrently, one or more data storage service partitions could be used, and would manage storage of data using the control data 1657 to track locks of particular regions in memory to ensure that no conflicting storage tasks (e.g., overwriting or changing database structures) occurs. Such data storage service partitions would be used for a data restoration operation, and could be located locally to the data partition 1650, or elsewhere within an overall network of host computing systems. Furthermore, use of two or more data storage service partitions could allow for recovery of a database by restoring a recent snapshot of the database, and continuing operation with a queue of transactions associated with a non-failing partition.

In still further embodiments, it is noted that two or more data partitions 1650 could be established separately across different host computing systems 1601. In such cases, concurrent, up-to-date, duplicate copies of a particular database (or a portion thereof, such as key tables or indices) could be maintained to allow for failover in the case of data corruption. The duplicate data, as well as the co-executing data storage services or data query services partitions, could be located anywhere within a multi-host system. As such, it is recognized that the host computing systems 1601a-b can be located across different locations, and can be incorporated with additional host computing systems not shown; as such, the use of two host computing systems is intended as illustrative, rather than limiting.

In connection with FIGS. 20B and 22, it is noted that analogous tasks to those described above could be performed in a data services partition 1690 that also includes an in-memory database. In such cases, the data services partition 1690 may, in the event of a snapshot, transfer snapshot data to an I/O partition for storage, as discussed above in connection with FIGS. 1-3. Although the specific implementation may be a matter of design choice, depending upon the particular application of the database, different arrangements may be advantageous. For example, a design of a database management system may not allow separate database services accessing common data. Alternatively, if such support is provided in a database management system, it may be advantageous to distribute data requests (queries and storage) across different partitions in case of failure of one or more partitions, which enhances the reliability of the overall database and database management arrangement. Still further advantages include further scalability of such an arrangement, at the tradeoff of increased complexity in managing data locks on the data 1658, 1698.

VI. Partition Instantiation and Management; Partition Zones

Figure 23:
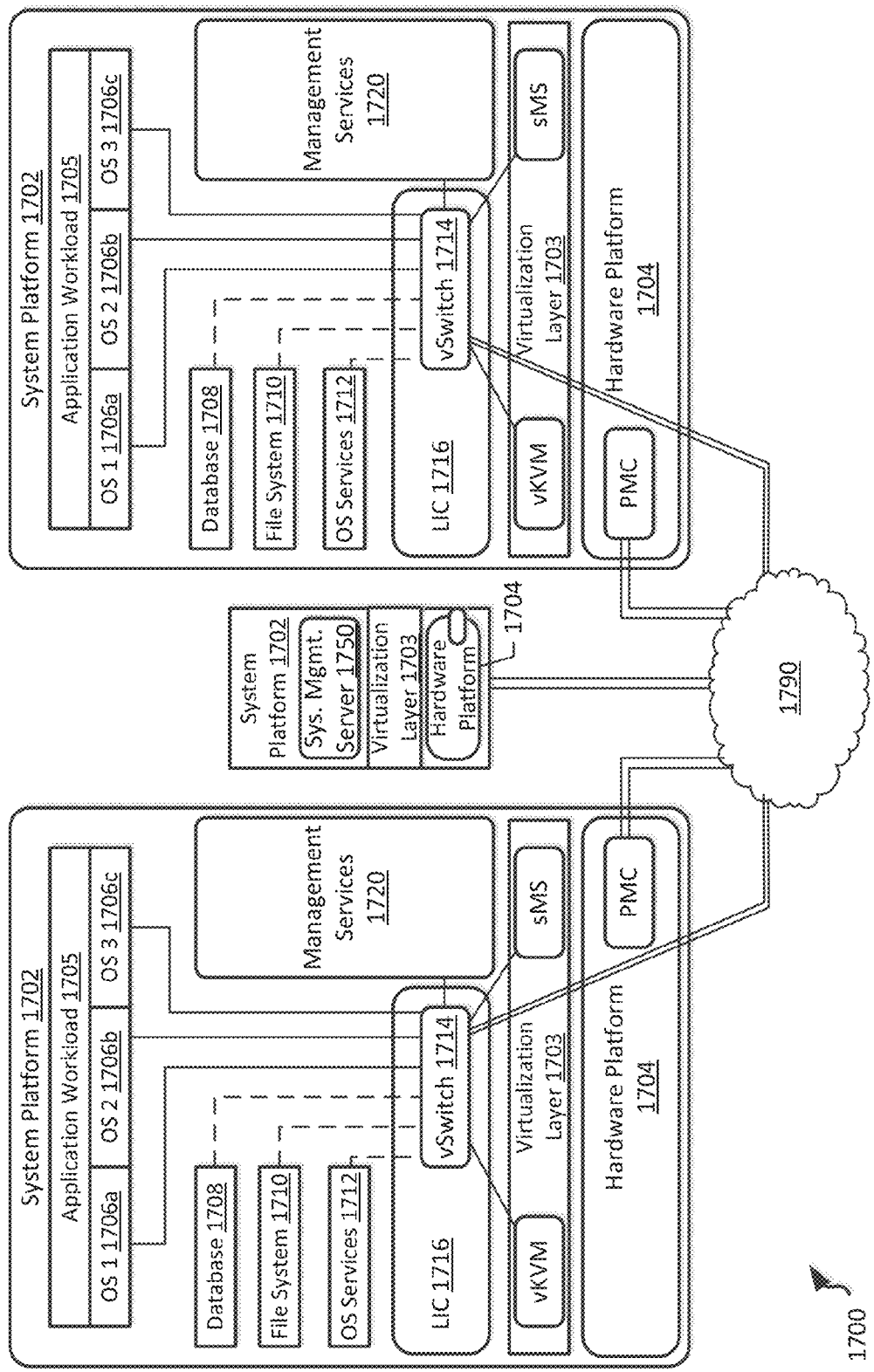
FIG. 23 illustrates a block diagram illustrating an arrangement for remotely managing partition allocation and groupings, according to an example embodiment.
Figure 24:
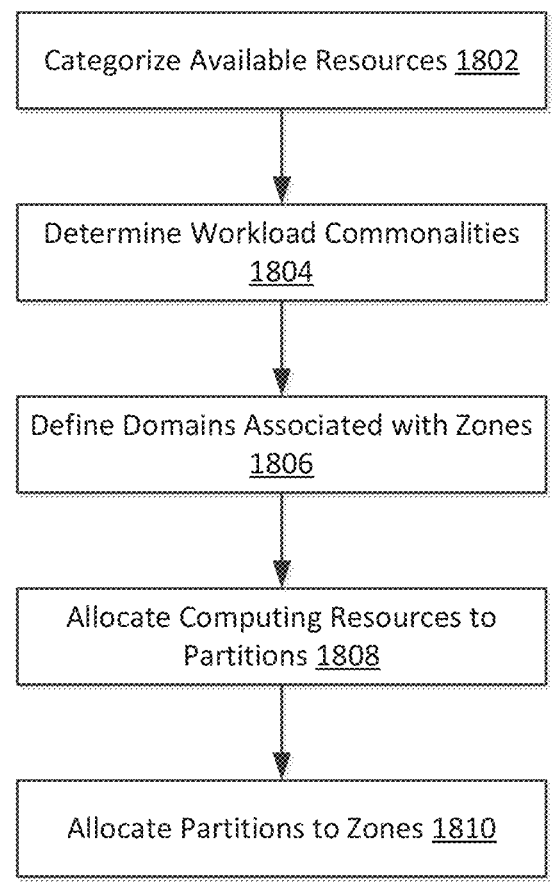
FIG. 24 is a flowchart of grouping of partitions according to functional and resource allocations, according to an example embodiment.
Figure 25:
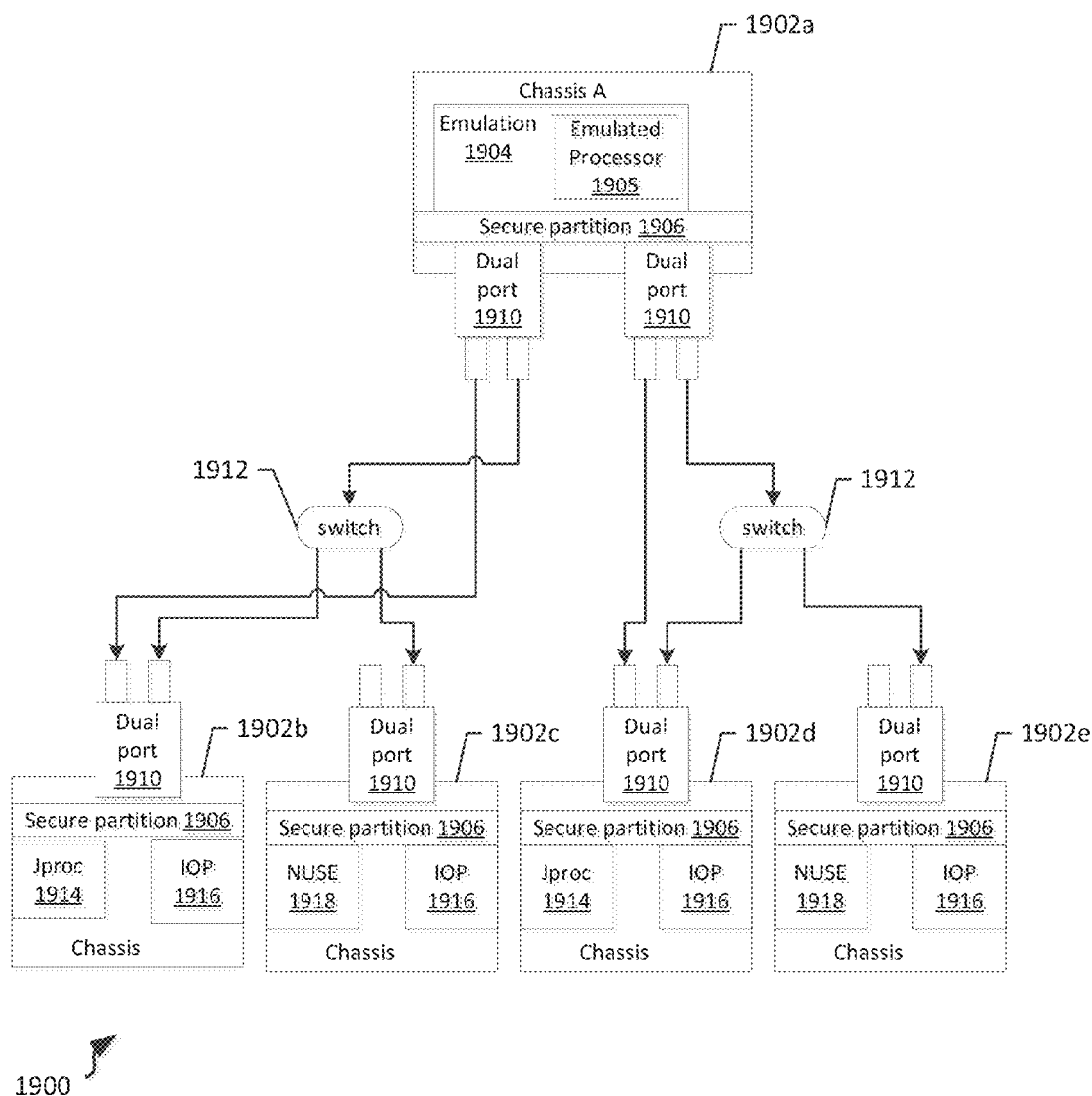
FIG. 25 is a logical diagram of an example implementation of a para-virtualization system providing special-purpose partitions useable to distribute various computing tasks, according to an example embodiment.

Referring now to FIGS. 23-25, additional details are provided regarding methods by which partitions can be configured and instantiated in the para-virtualization system of the present disclosure. In particular, the systems discussed herein provide for remote management and efficient grouping of computing resources as desired, for example by establishing zones of resources that may be of a common usage or common priority. In such cases, different policies, such as for execution core sharing, workload prioritization or dynamic resource reallocation may be applied.

Referring now to FIG. 23, a block diagram illustrating a system 1700 for remotely managing partition allocation and groupings, according to an example embodiment. The system 1700 can correspond to an implementation providing access to a resource service application of command partition 20, in an example embodiment.

In the embodiment shown, a plurality of system platforms 1702 are depicted, each having an associated hardware platform 1704. The system platforms and associated hardware platforms can, in various embodiments, correspond to different host computing systems 104. Each of the system platforms 1702 includes a virtualization layer 1703 as well, such as the interconnect API discussed above.

In the embodiment shown, each platform hosts a plurality of partitions including one or more application workloads 1705 hosted on one or more operating systems 1706a-c. The system platform 1702 could also include, in various embodiments, partitions including a database 1708, file system

1710, operating system services 1712, and management services 1720 (e.g., a service partition as illustrated in FIGS. 8-9, above). Each of the partitions can be communicatively connected, via a virtual switch 1714 as part of a local interconnect layer 1716, such that each partition views a different connection but rather all partitions are in shared memory. Virtual switches in different system platforms can be connected via a network 1790. Additional virtualized resources, such as a virtual KVM or other equipment, can be provided as well for peripheral or disk access features.

In the embodiment shown, at least one of the system platforms includes a system management server 1750. The system management server 1750 provides a web service accessible remotely from the para-virtualization system discussed herein, and provides a user interface allowing a remote user to view a listing of hardware resources and existing partitions as well as workloads executing thereon. The system management server 1750 also presents a web interface allowing the user to control workloads to be executed on other partitions or host systems, and allocation of aspects of those host systems (e.g., allocation of hardware resources, operation of the virtualization layer, partition interconnection permissions, etc.) Additionally, the system management server 1750 allows a user to view audit logs associated with the overall para-virtualization system, to see status of the overall system without requiring connection to the system by way of an API-enabled interconnect.

Management and security are also inherent to the system disclosed herein. In particular, system management server 1750 allows a user to define types of environments for each partition, and automates creation of such secure partitions. In example embodiments, partitions allocated within a particular zone could be deemed to be trusted partitions, allowed to access data within that zone as discussed herein. For example, partitions outside that zone may be required to include security features implemented for communication. By use of defined zones, a management service associated with the virtualization systems disclosed herein can provide a software definition of the areas or host systems that require a secure connection (e.g., due to being remotely located or in an unsecured location). Conversely, in some other arrangements, hosts or partitions within a particular zone may be deemed untrusted, thereby requiring those zones to have security features implemented between partitions throughout that zone.

As part of the resource allocations available by way of the system management server 1750, it is recognized that a remote (or local) user could define and manage one or more zones within the para-virtualization system. Referring back to FIGS. 1-3, a zone is an interconnected collection of resources. In an exemplary embodiment, zones are the visible manifestations of networks. Network details are left to network management products. A number of standard zone types are provided by the control partition 14. These correspond to some of the channel types described above (e.g., memory channels, I/O channels, command channels, etc., discussed in connection with FIG. 3). Control partition add-ins can define additional zone types, and administrators can define additional zone types for arbitrary categorization of host resources. These can be used to segregate resources by business unit or department, for example.

Guest partitions 24, 26, 28 are associated with the resource zones they require. Each host 10 is associated with the resource zones they provide. The operations service matches guests to hosts through the zones they have in common.

A partition of a network is referred to herein as a network zone. The zone is the unit of resource allocation to networks for communications (Ethernet), storage (SAN), power, etc. A logical network with zones for describing other resources may include, for example, monitor and firmware components that can be shared by all partitions. In the real world, however, it is necessary to describe which partitions should share a particular monitor or firmware implementation. Rather than define yet another mechanism, it is simpler and more powerful to apply logical network zones to these dimensions as well. The host 10 maps a logical firmware zone to a particular firmware implementation. Guest partitions 24, 26, 28 that specify a firmware channel that reference this zone will use this implementation. This allows arbitrarily complex component life cycle patterns to be modeled and yet scales down to trivial installations where only a single version of a single implementation is available.

A network zone is a collection of network gear (switches/routers/cables, such as network routing equipment 106 of FIG. 4) that can interchange packets of data. Different zones may or may not have gateways or firewalls to connect them. Hosts connected to a given zone have a name in some namespace. Typically DNS (Domain Name System) is used as the namespace for the host names. There is no requirement that hosts on a given zone all share the same DNS suffix (or not share the same DNS suffix). It will be appreciated by those skilled in the art that domains and zones are independent dimensions of a problem space; domains provide a namespace for things, while zones represent sets of things that are connected with wires. Zones can also describe power connections and memory and processor capabilities.

In accordance with the present disclosure, a network zone object defines an interconnected set of partitions. The control partition 14 can instantiate software Ethernet switches, routers and firewalls as necessary when partitions are activated. Hardware partitions can preload components needed to support all network zones identified by the hosted domains. A configuration with multiple host hardware partitions typically hosts different domains in different hardware partitions.

A partition configuration defines the limits of its configuration including available network channels that are associated with network zone objects. A virtual partition describes one or more configurations. Individual configurations can disable channels as necessary and override certain default configuration items. The host systems 10 are explicit in the object model. Furthermore, domains are associated with one or more host partitions, and assist in defining zones of resources. When multiple host partitions are associated with a domain, and partitions use SAN storage, policy determines the host 10 used to activate a partition.

Domain policies apply individually and collectively to the partitions in the domain. Key attributes are the importance of the partitions in the domain, maximum responsiveness requirements, as well as resource guarantees and limits of designated hosts that are divided by the partitions in the domain. Potential values for these attributes include:

Importance: (Mission Critical/Production/Test/Development);

Responsiveness: (Infrastructure, Interactive, Interactive Transactions, Batch Transactions, Batch); and Host partitions: Available and preferred with associated resource guarantees and limits.

Domain policy is used by domain agents to prioritize resource utilization. Relative importance is of concern primarily when domains share a host hardware partition. For example, dedicating a host 10 to a development domain dedicates the host hardware to development partitions. This defines the various types of zones available in a host or grouping of host computing systems The physical manifestation of some zone types is simply a software component, e.g. {Firmware, Monitor}. These zones allow host partitions to identify which firmware and monitor implementations are available, and guest partitions to identify component requirements or preferences. Some zone types have a physical manifestation: e.g. {Power, Processor, Memory}. These can be used to describe arbitrarily abstract available and desired capabilities of the host and guest partitions. Power zones allow guest partitions to specify specific host power sources. Processor and Memory zones allow data centers with a collection of non-uniform hosts to abstractly describe the processor and memory performance characteristics. This allows guests with the highest processor demands to be associated with the fastest host processors, and guests with greatest memory throughput demands to be associated with the hosts with fastest memory subsystems.

In connection with the present disclosure a further zone may relate to security, in particular for mission critical environments. For example, a partition's interconnect connections are stored in a partition 'blueprint' (along with other attributes of the partition) and a connection instance is created during the commissioning process at the same time as its other attributes. Thus the partition configuration and its visibility to other partitions via the control partition and interconnect API are 'managed' together. Lastly, the systems disclosed herein leverage benefits of built-in security features. For example, Fabric Interconnect ports, such as ports shown in FIG. 25, below, are identified in hardware only and participation in the fabric is by white list (i.e., switch ports are not configured 'open').

Relative to the zoning concept, all the partitions sharing a particular high speed interconnect configured to provide for High Availability could be grouped in one zone, whereas a partition with some combination—higher performance and density of platforms as well as tighter coupling between nodes would be appropriately identified as a Performance zone. This addresses the needs of users/workloads, which as yet are not defined or understood. Hence it will interpret and parse user requirements along with a set of SLA-driven attributes (provided by the user/workload) and position workloads in the most 'desirable' location (zone/node(s)) in the fabric.

As illustrated in FIG. 24, a method 1800 for allocating resources of host systems into zones is illustrated in connection with the API-based arrangements discussed herein. Generally, the method 1800 includes categorizing the available resources, at operation 1802, in the one or more host systems based on features of that physical manifestation that are particularly suited to being used for a specific zone (e.g., high performance processing cores used for computing intensive, mission-critical workloads, large scale/fast memory for database access, etc.). Workload commonalities are also assessed, to determine whether particular workloads would be advantageously run on a particular type of hardware, in operation 1804.

Once hardware and workloads are categorized, one or more domains can be defined based on the local grouping of computing resources, and which will be assigned as different types of zones. Operation 1808 associates the computing resources and domains with partitions intended to execute workloads targeted for those particular computing resources. Additionally, those partitions are then allocated to zones, for example based on importance, responsiveness, resiliency/redundancy, or other features.

It is noted that the zone-based allocation of resources can be performed using the system management server 1750 and associated web-based user interface described above in connection with FIG. 23; however in alternative embodiments, other allocation techniques, such as automated or partially-automated zone allocations, could be implemented as well.

Referring now to FIG. 25, a logical diagram of an example para-virtualization system 1900 is shown, providing special-purpose partitions useable to distribute various computing tasks, according to an example embodiment of the present disclosure. As illustrated, the system 1900 includes a plurality of distributed chassis 1902*a-e*, each interconnected using the interconnect API discussed herein, and providing, dedicated special purpose machines useable to distribute various tasks. In the embodiment shown, a first chassis 1902 includes a, including an emulated host system 1904 including an emulated execution core 1905, such as an OS2200 emulated system executing within an emulation system, such as the SAIL emulation system from Unisys Corporation of Blue Bell, Pa.

The host operating system 1904 operates within a secure partition 1906, which implements both interconnection to other host systems by way of the interconnect API, but also secure communication over ports 1910 and switches 1912, for example based on implementation of Stealth Data-in-Motion cryptographic data communication technologies provided by Unisys Corporation of Blue Bell, Pa. Chassis 1902*b-d* also implement secure partitioning software 1906, and implement specific processing systems, including a Java processor 1914 and I/O processor 1916 on chassis 1902*b*, 1903*d* and a NUSE processor 1918 and I/O processor 1916 on chassis 1902*c*, 1902*e*. In such an arrangement, the emulated system 1904 could offload processing tasks from the emulated execution core 1905 to special purpose Java and/or NUSE cores, thereby improving performance of the emulated software executing on chassis 1902*a*.

Referring to FIGS. 1-25 overall, it is noted that there are numerous advantages attendant to the para-virtualization system discussed herein. For example, the interconnection features and API allows for communication between virtual partitions irrespective of whether such partitions are collocated on a single host computing system or distributed across different computing systems. Furthermore, in view of the flexibility of allocation of partitions (e.g., remotely via a web service, and allowing for various selections of processing cores, memory, disk, network interfaces, etc.), various types of guest partitions and special-purpose "service" partitions can be created, thereby specializing and grouping computing tasks however desired within one or more data centers or locations where host computing systems reside. Still further, since the interconnect is transparent, it can be used without rewriting existing applications or avoiding workloads that require particular communication connections (due to the flexibility of interconnection via various API bindings). Furthermore, and beyond the traditional "networking model" protocols, APIs, and security measures discussed above, the architecture discussed herein is extensible to "non-networking" protocols. These could include "message or token passing" protocols, "shared memory queues", "data bus" technologies or others. Other advantages exist as well, and are reflected in the set of claims appended hereto.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system comprising:
one or more host computing systems implemented at least partially by hardware, each host computing system including at least one execution core and a system memory;
a plurality of virtual partitions executing on the one or more host computing systems and including
a first virtual partition having at least a portion of the system memory associated with at least one of the one or more host computing systems and configured to store a database in the first virtual partition, and
a control virtual partition having at least another portion of the system memory associated with the at least one of the one or more host computing systems and configured to store a master resource database containing all resource assignments for all of the plurality of virtual partitions;
an interconnect layer communicatively connecting the plurality of virtual partitions, the interconnect layer providing a programming interface by which direct memory access operations between any of the plurality of plurality of partitions are coordinated;
wherein, in response to database commands received at the first virtual partition, data stored in the database of the first virtual partition is provided to a requesting virtual partition as a direct memory access operation, wherein the requesting virtual partition being any of the plurality of partitions;
the plurality of virtual partitions each comprises its own partition monitor that constrains applications running within each virtual partition to only assigned resources and protects processor-provided resources using memory mapped I/O operations according to the resource assignments;
the partition monitor within the virtual control partition creates and terminates the partition monitors in all other virtual partitions and aids processor context switches from one virtual partition to another, wherein the processor context switches being associated with at least a guest partition state and a privileged state of at least a virtual partition;
the partition monitor of each virtual partition being able to adaptively support features of each of the plurality of virtual partitions.

2. The system of claim 1, further comprising a first service partition including at least one execution core and a portion of an associated system memory associated with the at least one execution core, the first service partition hosting a database server service associated with the database.

3. The system of claim 2, wherein the plurality of virtual partitions includes at least one guest partition executing a database client application configured to access the database via database queries transmitted to the database server service of the first service partition.

4. The system of claim 3, wherein the one or more host computing systems includes a first host computing system and a second host computing system, and wherein at least a portion of the system memory comprises system memory associated with both the first and second host computing systems.

5. The system of claim 4, wherein the database is maintained in the system memory associated with both the first and second host computing systems.

6. The system of claim 4, wherein the first service partition resides on at least one of the first or second host computing systems.

7. The system of claim 4, wherein the plurality of virtual partitions includes a second service partition hosting a second database server service associated with the database.

8. The system of claim 7, wherein the first and second service partitions are respectively located on the first and second host computing systems.

9. The system of claim 8, wherein the database of the first service partition is distributed in system memory of the first and second host computing systems.

10. The system of claim 8, wherein the first service partition, the second service partition, and the guest partition reside on a same host system, and wherein, in response to a database query received from the database client application executing on the guest partition, the database server service coordinates a direct memory access data transfer from the database to the database client application.

11. The system of claim 2, wherein the database server service is provided trusted access to the at least portion of the system memory included in the database such that a database command issued by the database server service returns a pointer to data stored in the database.

12. The system of claim 1, wherein the control partition executing a management application configured to manage allocation of the resource assignments.

13. The system of claim 1, wherein the first partition further includes at least one execution core and hosts a database server service.

\* \* \* \* \*